US011563897B2

(12) United States Patent
Dai et al.

(10) Patent No.: US 11,563,897 B2
(45) Date of Patent: Jan. 24, 2023

(54) IMAGE PROCESSING METHOD AND APPARATUS WHICH DETERMINES AN IMAGE PROCESSING MODE BASED ON STATUS INFORMATION OF THE TERMINAL DEVICE AND PHOTOGRAPHING SCENE INFORMATION

(71) Applicant: Huawei Technologies Co., Ltd., Shenzhen (CN)

(72) Inventors: Jun Dai, Hangzhou (CN); Biying Hu, Hangzhou (CN); Yining Huang, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/476,842

(22) Filed: Sep. 16, 2021

(65) Prior Publication Data
US 2022/0006937 A1    Jan. 6, 2022

Related U.S. Application Data

(63) Continuation of application No. 16/673,206, filed on Nov. 4, 2019, now Pat. No. 11,140,329, which is a (Continued)

(30) Foreign Application Priority Data

Mar. 23, 2018    (CN) .......................... 201810247249.0

(51) Int. Cl.
*H04N 5/235*    (2006.01)
*H04N 5/265*    (2006.01)

(52) U.S. Cl.
CPC .......... *H04N 5/2351* (2013.01); *H04N 5/2353* (2013.01); *H04N 5/2355* (2013.01); *H04N 5/2356* (2013.01); *H04N 5/265* (2013.01)

(58) Field of Classification Search
CPC .. H04N 5/2351; H04N 5/2353; H04N 5/2355; H04N 5/2356; H04N 5/265; H04N 5/23258
See application file for complete search history.

(56) References Cited

U.S. PATENT DOCUMENTS 11,140,329 B2 * 10/2021 Dai ..................... H04N 5/2353
2009/0102945 A1    4/2009 Chen
(Continued)

FOREIGN PATENT DOCUMENTS

CN    101420531 A    4/2009
CN    102457675 A    5/2012
(Continued)

OTHER PUBLICATIONS

Hasinoff, S., et al., "Burst photography for high dynamic range and low-light imaging on mobile cameras," ACM Trans. Graph., vol. 35, No. 6, Article 192, Publication Date: Nov. 2016, 12 pages.

*Primary Examiner* — Luong T Nguyen
(74) *Attorney, Agent, or Firm* — Conley Rose, P.C.

(57) ABSTRACT

An image processing method includes obtaining status information of a terminal device, obtaining photographing scene information of the terminal device, determining an image processing mode based on the status information and the photographing scene information, obtaining a to-be-displayed image, and processing the to-be-displayed image based on the image processing mode.

20 Claims, 8 Drawing Sheets

Related U.S. Application Data continuation of application No. PCT/CN2018/120735, filed on Dec. 12, 2018.

(56) References Cited

U.S. PATENT DOCUMENTS

| | | |
|---|---|---|
| 2010/0271512 A1* | 10/2010 | Garten ............... H04N 5/2355 382/284 |
| 2011/0211732 A1 | 9/2011 | Rapaport |
| 2012/0007996 A1 | 1/2012 | Bilcu |
| 2013/0293729 A1 | 11/2013 | Osawa |
| 2014/0347521 A1 | 11/2014 | Hasinoff et al. |
| 2015/0271405 A1 | 9/2015 | Lameer et al. |
| 2015/0312463 A1 | 10/2015 | Gupta et al. |
| 2015/0348242 A1 | 12/2015 | Molgaard et al. |
| 2017/0150028 A1 | 5/2017 | Robertson et al. |
| 2017/0195596 A1 | 7/2017 | Vogelsang et al. |
| 2017/0230562 A1 | 8/2017 | Gupta et al. |
| 2017/0278546 A1 | 9/2017 | Xiao et al. |
| 2018/0227479 A1* | 8/2018 | Parameswaran ............... H04N 5/232133 |
| 2019/0230273 A1 | 7/2019 | Min et al. |

FOREIGN PATENT DOCUMENTS

| | | |
|---|---|---|
| CN | 103384309 A | 11/2013 |
| CN | 105163047 A | 12/2015 |
| CN | 107230187 A | 10/2017 |
| CN | 107635093 A | 1/2018 |
| CN | 108391059 A | 8/2018 |
| EP | 3267675 A1 | 1/2018 |
| JP | 2006197243 A | 7/2006 |
| JP | 2013069012 A | 4/2013 |
| TW | 201347527 A | 11/2013 |
| WO | 2014190051 A1 | 11/2014 |
| WO | 2015043853 A1 | 3/2018 |

* cited by examiner

IMAGE PROCESSING METHOD AND APPARATUS WHICH DETERMINES AN IMAGE PROCESSING MODE BASED ON STATUS INFORMATION OF THE TERMINAL DEVICE AND PHOTOGRAPHING SCENE INFORMATION

CROSS-REFERENCE TO RELATED APPLICATION

This application is a continuation of U.S. patent application Ser. No. 16/673,206 filed on Nov. 4, 2019, which is a continuation of International Patent Application No. PCT/CN2018/120735 filed on Dec. 12, 2018, which claims priority to Chinese Patent Application No. 201810247249.0 filed on Mar. 23, 2018. All of the aforementioned patent applications are hereby incorporated by reference in their entireties.

TECHNICAL FIELD

This application relates to the field of photographic technologies, and in particular, to an image processing method and apparatus.

BACKGROUND

Night photography has always been a challenge in mobile phone photography. There is an excessively large difference between brightness of a light source and brightness in an area without a light source, resulting in a very high dynamic range (also referred to as HDR). Both high-brightness overexposure and low-brightness underexposure tend to occur in single-frame photographing. In addition, because brightness is usually low in a night scene, within a limited exposure time, relatively high noise exists in a non-high dynamic scene, and it is difficult to obtain a high-quality image. In an actual photographing scene, brightness varies greatly in many high dynamic scenes, for example, a sunny outdoor backlit scene, and a night portrait scene. In a single image, only a part of information in a scene with a high dynamic range can be collected or there is a problem of overexposure in a bright area or there is a problem of insufficient brightness in a dark area.

In a night high dynamic scene, to obtain a high dynamic range picture, a general solution in the industry is fusion of a plurality of frames of images with different exposures. For example, in a solution disclosed in CN105163047A, a plurality of frames of Joint Photographic Experts Group (JPG) images are first taken with different exposure settings and used as inputs (usually three frames of images are taken, namely, a short exposure image, a normal exposure image, and a long exposure image), the three frames of input images are then converted into three frames of images with actual brightness of the scene using a camera response curve, and registration and ghosting detection operations are performed next to merging the three frames of images into one frame of high dynamic range image. In other approaches, a mediocre imaging effect is produced when images with different brightness are merged.

SUMMARY

An embodiment of a first aspect of this application provides an image processing apparatus, where the apparatus includes an obtaining module, where the obtaining module is configured to obtain status information of a terminal device, an image photographing module, where the image photographing module is configured to obtain photographing scene information of the terminal device, and a mode selection module, where the mode selection module is configured to determine an image processing mode based on the status information and the photographing scene information, where the image photographing module is further configured to obtain a to-be-displayed image based on the image processing mode.

According to the image processing apparatus of this embodiment of the present disclosure, different image processing modes may be selected based on the status information of the terminal device and a determining result of the photographing scene information, and different adjusted exposure values and different image fusion modes are used to take better images for subsequent merging.

The terminal device according to this embodiment of the present disclosure may be a smartphone or a tablet computer that has a photographing function, or may be another wearable device that has a photographing function, for example, a smartwatch, smart glasses or a smart helmet.

In a possible implementation, the status information is used to determine whether a photographing status of the terminal device is stable.

In a possible implementation, the obtaining module may obtain the status information of the terminal device from a gravity sensor or a gyroscope of the terminal device. The status information may be information directly collected by a sensor of the terminal device, for example, may be information collected by a device, for example, the gravity sensor or the gyroscope, of the terminal device, or may be information obtained after calculation or other processing performed on the foregoing information.

In a possible implementation, a value of acceleration due to gravity may be measured using the gravity sensor, and is used as the status information. In another possible implementation, the gyroscope may be used for measurement to determine whether the terminal device is in a stable state, and posture information of the terminal device collected by the gyroscope is used as the status information.

It can be understood that, before the status information of the terminal device is obtained, the terminal device may further obtain trigger information, where the trigger information may enable the terminal device to enter a preview display mode to present, on a display of the terminal device, an image captured by a camera. The trigger information may be information, for example, a shutter button, formed when a user presses a physical key of a mobile terminal, or may be information, for example, activation of a photographing function of a camera by a tap or a swipe, formed after a user performs a corresponding operation on a touchscreen. In a possible implementation, in the preview display mode, the terminal device presents, on the display, an image captured by the camera, to show the user image content that can be captured by the camera currently to facilitate adjustment of a corresponding framing status by the user. However, at this time, a picture has not been taken yet, and a framed image is not stored in a storage medium of the device (but corresponding parameters or image data is stored in a buffer for a period of time). In a photographing mode, after the user finishes framing and presses the shutter button, the device obtains an image captured by the camera, and after processing using a corresponding method, a final photo image is stored in the storage medium of the device.

In a possible implementation, the photographing scene information is used to determine whether a photographing scene of the terminal device is a high dynamic scene.

In a possible implementation, the image photographing module may obtain the photographing scene information based on image data obtained by the camera. The photographing scene information may be a histogram of a current image, or the photographing scene information may be a dynamic range of a current image.

Histograms are widely used in image processing, and a brightness histogram is a chart used to present image brightness distribution, and shows image proportions of objects with different brightness in an image. For example, in a histogram of an image, a horizontal axis represents brightness in the image with gradual transition from black to white from left to right, and a vertical axis represents a relative quantity of pixels within a brightness range in the image.

In the field of image photographing processing, a dynamic range is mainly a brightness range of a photographed object, namely, a range that spans from brightness of a darkest spot to brightness of a brightest spot in the photographed object. In a scene with a large dynamic range, there is a relatively large difference between brightness of a brightest part and brightness of a darkest part, and a picture has a high contrast and rich gradients. In a scene with a small dynamic range, most objects have similar brightness, and a picture has a low contrast. The dynamic range may be quantitatively described by a ratio or a difference.

In a possible implementation, the mode selection module is configured to determine, based on the status information, whether a photographing status of the terminal device is stable, determine, based on the photographing scene information, whether a photographing scene of the terminal device is a high dynamic scene, and determine the image processing mode as a first exposure fusion mode when the photographing status of the terminal device is stable and the photographing scene of the terminal device is a high dynamic scene, where exposure values of at least two adjacent frames of images are different in the first exposure fusion mode.

When the terminal device is in a stationary state, for example, is placed on a tripod or another fixing apparatus, it may be considered that the terminal device is in a stable state. When the terminal device is in a moving state or a slightly shaky state, for example, the user holds the terminal device for photographing, or the user holds a fixing apparatus (for example, a selfie stick) of the terminal device for photographing, it may be considered that the terminal device is in a nonstable state. In a possible implementation, whether the terminal device is in a stable state may be determined by comparing the status information with a preset threshold. For example, when a value obtained by the gyroscope is greater than a first threshold, it may be considered that the terminal device is in a nonstable state, or when a value obtained by the gyroscope is less than or equal to a first threshold, it may be considered that the terminal device is in a stable state. A value range of the first threshold may be greater than 0.005 and less than 0.015. For example, the first threshold may be 0.01.

In a possible implementation, a current photographing scene may be determined using a histogram of a current image. For example, the histogram of the current image is first obtained to calculate an overexposure ratio and an underexposure ratio in the histogram. For example, a pixel whose brightness is greater than 250 is defined as an overexposure pixel, and a pixel whose brightness is less than 10 is defined as an underexposure pixel. An overexposure ratio and an underexposure ratio are calculated. If the overexposure ratio is greater than a preset threshold and the underexposure ratio is greater than another preset threshold, it may be considered that an image has a high dynamic scene. Usually, ratios in a high dynamic range are adjusted based on an actual effect of an algorithm. For example, it is determined that an overexposure ratio is greater than 1% and an underexposure ratio is greater than 5% or 10%. For another example, the overexposure ratio may be a value between 0.5% and 2%, and the underexposure ratio may be a value between 5% and 10%. It can be understood that the foregoing is merely an example of determining a high dynamic scene, and a person of ordinary skill in the art may obtain a dynamic range of an image in another manner. Details are not described herein. It can be understood that, in some application scenarios, the user may determine whether to use a high dynamic scene or not.

It can be understood that, in this embodiment of the present disclosure, in an implementation, different exposure fusion modes may be chosen based on different status information and different photographing scene information to determine whether the terminal device is in a stable state and whether a photographing scene is a high dynamic scene, and no specific parameter is required to represent a stable state or a high dynamic scene. For example, when the status information is greater than the first threshold, it is considered that the terminal device is in an unstable photographing state. In an implementation, corresponding parameters may represent the status information and the photographing scene information of the terminal device. For example, when the status information is greater than the first threshold, a value (where the value may be 0, 1 or another value) may be assigned to a status parameter of the terminal device.

In this embodiment of the present disclosure, at least two frames of images may be taken in an exposure fusion mode, and when the first exposure fusion mode is used for photographing, exposure values of at least two adjacent frames of images are different. For example, an exposure value of an image frame is 30, and an exposure value of a next image frame may be 31. It can be understood that, exposure values of two adjacent image frames of a plurality of frames of images taken using the first exposure fusion mode may be the same. For example, there are three frames of images, and exposure values corresponding to the three frames of images may be 30, 31, and 31.

For a high dynamic scene, a high dynamic range image with better quality can be obtained in the high dynamic scene using an exposure fusion mode with different exposure values.

In a possible implementation, when the photographing status of the terminal device is stable and the photographing scene of the terminal device is not a high dynamic scene, a second exposure fusion mode is determined as the image processing mode, where exposure values of images are the same in the second exposure fusion mode. For example, three frames of images are taken in the second exposure fusion mode, and an exposure value corresponding to each frame may be 40.

For a non-high dynamic scene, the same exposure value is used for processing, and an image of lower noise can be obtained.

In a possible implementation, when the photographing status of the terminal device is unstable and the photographing scene of the terminal device is a high dynamic scene, a third exposure fusion mode is determined as the image processing mode, where exposure values of at least two adjacent frames of images are different in the third exposure fusion mode.

In a possible implementation, when the photographing status of the terminal device is unstable and the photographing scene of the terminal device is not a high dynamic scene, a fourth exposure fusion mode is determined as the image processing mode, where exposure values of images are the same in the fourth exposure fusion mode.

In a possible implementation, an exposure time of the first exposure fusion mode is greater than an exposure time of the third exposure fusion mode. During photographing of a plurality of frames of images, that an exposure time of the first exposure fusion mode is greater than an exposure time of the third exposure fusion mode herein may be that an exposure time of a frame of image corresponding to a maximum exposure value in the first exposure fusion mode is greater than an exposure time of a frame of image corresponding to a maximum exposure value in the third exposure fusion mode, or may be that when an exposure value of a frame of image in the first exposure fusion mode is equal to an exposure value of a frame of image in the third exposure fusion mode, an exposure time of the frame of image in the first exposure fusion mode is greater than an exposure time of the frame of image in the third exposure fusion mode.

For example, a maximum exposure time of a frame corresponding to the maximum exposure value in the first exposure fusion mode is one second, and a maximum exposure time of a frame corresponding to the maximum exposure value in the third exposure fusion mode is 250 milliseconds. In addition, to implement a specific exposure value, in the first exposure fusion mode, a relatively long exposure time is used, and a relatively small international organization for standardization (ISO) value and a relatively small aperture value are used. For example, an exposure time of 500 milliseconds and an ISO value of 100 are used. In the third mode, to implement the same exposure value, a relatively short exposure time is used, and a relatively large ISO value and a relatively large aperture value are used. For example, a combination of an exposure time of 100 milliseconds and an ISO value of 500 is used.

In a possible implementation, an exposure time of the second exposure fusion mode is greater than an exposure time of the fourth exposure fusion mode. For example, a maximum exposure time of a frame corresponding to the maximum exposure value in the second exposure fusion mode is two seconds, and a maximum exposure time of a frame corresponding to the maximum exposure value in the fourth exposure fusion mode is one second. In addition, to implement a specific exposure value, in the second exposure fusion mode, a relatively long exposure time is used, and a relatively small ISO value and a relatively small aperture value are used. For example, an exposure time of 500 milliseconds and an ISO value of 100 are used. In the fourth mode, to implement the same exposure value, a relatively short exposure time is used, and a relatively large ISO value and a relatively large aperture value are used. For example, a combination of an exposure time of 100 milliseconds and an ISO value of 500 is used.

It can be understood that, "not a high dynamic scene" and "a non-high dynamic scene" have the same meaning in this embodiment of the present disclosure.

In a possible implementation, a quantity of to-be-processed frames of images in the first exposure fusion mode is equal to a quantity of to-be-processed frames of images in the second exposure fusion mode.

In a possible implementation, a quantity of to-be-processed frames of images in the third exposure fusion mode is equal to a quantity of to-be-processed frames of images in the fourth exposure fusion mode.

In a possible implementation, a quantity of to-be-processed frames of images in the first exposure fusion mode is greater than a quantity of to-be-processed frames of images in the third exposure fusion mode or the fourth exposure fusion mode.

In a possible implementation, a quantity of to-be-processed frames of images in the second exposure fusion mode is equal to a quantity of to-be-processed frames of images in the fourth exposure fusion mode.

In a possible implementation, a quantity of to-be-processed frames of images in the second exposure fusion mode is not equal to a quantity of to-be-processed frames of images in the fourth exposure fusion mode.

After an image processing mode to be used is determined, the image photographing module obtains a to-be-displayed image based on the corresponding processing mode for processing.

In a possible implementation, obtaining a to-be-displayed image based on the image processing mode according to this embodiment of the present disclosure may be obtaining the to-be-displayed image using the camera based on the corresponding exposure parameters after a quantity of frames of images and exposure parameters corresponding to the frames are determined. Exposure parameters corresponding to different image processing modes are set in different manners. It can be understood that in an implementation, a processing process of determining the quantity of frames of images and the exposure parameters corresponding to the frames may be performed by a processor of the terminal device, and the camera of the terminal device obtains a to-be-displayed image based on the specified exposure parameters.

In a possible implementation, the to-be-displayed image may be an image that needs to be captured by a camera when the user presses the shutter button. The shutter button may be a physical key or a virtual key on a touchscreen. In some examples, photographing may be triggered by capturing a voice instruction or an action of the user instead of being triggered by the shutter button. In this case, data captured by the camera is a to-be-displayed image.

In an example, the to-be-displayed image may include a plurality of frames of images taken by the camera after the photographing function is triggered. The to-be-displayed image may be the first frame of image taken by the camera after the photographing function is triggered, or may be the last frame of image taken by the camera in a photographing cycle after the photographing function is triggered, or may be an image taken by the camera at an intermediate moment in a photographing cycle after the photographing function is triggered. The photographing cycle in the example may be a photographing time period for a plurality of frames of images to be taken in an exposure fusion mode. For example, 10 frames of images need to be taken in the first exposure fusion mode, and the current to-be-displayed image may be the first frame of image, the fourth frame of image, or the tenth frame of image.

In a possible implementation, the current image in the foregoing embodiment is image data obtained by the camera when the photographing function of the terminal device is triggered. In this case, the terminal device may be in the preview display mode. In an example, a previous frame of image of the to-be-displayed image is the current image. Exposure parameters required for taking the to-be-displayed image are set based on parameter information, for example, a histogram, of the current image and status information of the terminal device.

In a possible implementation, the image photographing module may perform corresponding functions based on different output results of the mode selection module to process the to-be-displayed image.

In a possible implementation of this embodiment of the present disclosure, the image processing apparatus further includes a processing module, where the processing module is configured to process the to-be-displayed image, for example, perform an operation such as image merging to obtain a processed image.

In a possible implementation of this embodiment of the present disclosure, functions of the mode selection module and the processing module may be performed by the processor of the terminal device.

In a possible implementation, the image processing apparatus further includes a presentation module, where the presentation module is configured to display the processed image.

In a possible implementation, the presentation module may be the display of the terminal device. Displaying the processed image includes displaying a final merged image. Alternatively, the processed image may be presented in a preview manner. For example, the current processed image is displayed in a process of processing a plurality of frames of images using the image processing mode.

In an example, the terminal device generates a large quantity of original outputs, and the terminal device then successively processes each received frame of image. Each time the terminal device receives a frame of image, the terminal device merges the frame of image and a processing result of a previous frame of image into an image, and displays a current processing result on the screen for preview until the user ends the processing in advance. Alternatively, after all frames are processed, a final result is stored in the device.

An embodiment of a second aspect of the present disclosure discloses an image processing method, where the method includes obtaining status information of a terminal device, obtaining photographing scene information of the terminal device, determining an image processing mode based on the status information and the photographing scene information, and obtaining a to-be-displayed image based on the image processing mode.

According to the image processing method in this embodiment of the present disclosure, different image processing modes may be selected based on the status information of the terminal device and a determining result of the photographing scene information, and different exposure values and different image fusion modes are used to obtain a better merged image.

In a possible implementation, determining an image processing mode based on the status information and the photographing scene information includes determining, based on the status information, whether a photographing status of the terminal device is stable, determining, based on the photographing scene information, whether a photographing scene of the terminal device is a high dynamic scene, and determining the image processing mode as a first exposure fusion mode when the photographing status of the terminal device is stable and the photographing scene of the terminal device is a high dynamic scene, where exposure values of at least two adjacent frames of images are different in the first exposure fusion mode.

In a possible implementation, determining an image processing mode based on the status information and the photographing scene information includes determining, based on the status information, whether a photographing status of the terminal device is stable, determining, based on the photographing scene information, whether a photographing scene of the terminal device is a high dynamic scene, and determining the image processing mode as a second exposure fusion mode when the photographing status of the terminal device is stable and the photographing scene of the terminal device is not a high dynamic scene, where exposure values of images are the same in the second exposure fusion mode.

In a possible implementation, determining an image processing mode based on the status information and the photographing scene information includes determining, based on the status information, whether a photographing status of the terminal device is stable, determining, based on the photographing scene information, whether a photographing scene of the terminal device is a high dynamic scene, and determining the image processing mode as a third exposure fusion mode when the photographing status of the terminal device is unstable and the photographing scene of the terminal device is a high dynamic scene, where exposure values of at least two adjacent frames of images are different in the third exposure fusion mode.

In a possible implementation, determining an image processing mode based on the status information and the photographing scene information includes determining, based on the status information, whether a photographing status of the terminal device is stable, determining, based on the photographing scene information, whether a photographing scene of the terminal device is a high dynamic scene, and determining the image processing mode as a fourth exposure fusion mode when the photographing status of the terminal device is unstable and the photographing scene of the terminal device is not a high dynamic scene, where exposure values of images are the same in the fourth exposure fusion mode.

In a possible implementation, determining an image processing mode based on the status information and the photographing scene information includes determining, based on the photographing scene information, that a first exposure fusion mode or a second exposure fusion mode is the image processing mode when the status information of the terminal is not greater than a first preset threshold, where the first preset threshold is greater than 0.005 and less than 0.015, exposure values of at least two adjacent frames of images are different in the first exposure fusion mode, and exposure values of images are the same in the second exposure fusion mode.

In a possible implementation, determining an image processing mode based on the status information and the photographing scene information includes determining, based on the photographing scene information, that a third exposure fusion mode or a fourth exposure fusion mode is the image processing mode when the status information of the terminal is greater than a first preset threshold, where the first preset threshold is greater than 0.005 and less than 0.015, exposure values of at least two adjacent frames of images are different in the third exposure fusion mode, and exposure values of images are the same in the fourth exposure fusion mode.

In a possible implementation, determining an image processing mode based on the status information and the photographing scene information includes determining, based on the photographing scene information, that a photographing scene of the terminal device is a high dynamic scene, determining, based on the status information, whether a photographing status of the terminal device is stable, determining the image processing mode as a first exposure fusion mode when the photographing status of the terminal device is stable, where exposure values of at least two adjacent frames of images are different in the first exposure fusion mode, and determining the image processing mode as a third exposure fusion mode when the photographing status of the terminal device is unstable, where exposure values of at least two adjacent frames of images are different in the third exposure fusion mode, and an exposure time of the first exposure fusion mode is greater than an exposure time of the third exposure fusion mode.

In a possible implementation, determining an image processing mode based on the status information and the photographing scene information includes determining, based on the photographing scene information, that a photographing scene of the terminal device is a non-high dynamic scene, determining, based on the status information, whether a photographing status of the terminal device is stable, determining the image processing mode as a second exposure fusion mode when the photographing status of the terminal device is stable, where exposure values of images are the same in the second exposure fusion mode, and determining the image processing mode as a fourth exposure fusion mode when the photographing status of the terminal device is unstable, where exposure values of images are the same in the fourth exposure fusion mode, and an exposure time of the second exposure fusion mode is greater than an exposure time of the fourth exposure fusion mode.

In a possible implementation, determining an image processing mode based on the status information and the photographing scene information includes determining, based on the photographing scene information, that a photographing scene of the terminal device is a high dynamic scene, determining the image processing mode as a first exposure fusion mode when the status information of the terminal is not greater than a first preset threshold, where exposure values of at least two adjacent frames of images are different in the first exposure fusion mode, and determining the image processing mode as a third exposure fusion mode when the status information of the terminal is greater than a first preset threshold, where exposure values of at least two adjacent frames of images are different in the third exposure fusion mode, where the first preset threshold is greater than 0.005 and less than 0.015, and an exposure time of the first exposure fusion mode is greater than an exposure time of the third exposure fusion mode.

In a possible implementation, determining an image processing mode based on the status information and the photographing scene information includes determining, based on the photographing scene information, that a photographing scene of the terminal device is a non-high dynamic scene, determining the image processing mode as a second exposure fusion mode when the status information of the terminal is not greater than a first preset threshold, where exposure values of images are the same in the second exposure fusion mode, and determining the image processing mode as a fourth exposure fusion mode when the status information of the terminal is greater than a first preset threshold, where exposure values of images are the same in the fourth exposure fusion mode, where the first preset threshold is greater than 0.005 and less than 0.015, and an exposure time of the second exposure fusion mode is greater than an exposure time of the fourth exposure fusion mode.

For examples and specific implementations of corresponding characteristics in the embodiment of the second aspect of the present disclosure, refer to related specifications in the foregoing embodiment of the first aspect. Details are not described herein again.

An embodiment of a third aspect of the present disclosure discloses an image processing apparatus, where the apparatus includes an obtaining module, where the obtaining module is configured to obtain status information of a terminal device, a mode selection module, where the mode selection module is configured to select a first image processing mode set or a second image processing mode set based on the status information, where an exposure time of any image processing mode in the first image processing mode set is greater than an exposure time of any image processing mode in the second image processing mode set, an image photographing module, where the image photographing module is configured to obtain photographing scene information of the terminal device, where the mode selection module is further configured to determine a target image processing mode from the first image processing mode set or the second image processing mode set based on the photographing scene information, and the image photographing module is further configured to obtain a to-be-displayed image based on the target image processing mode.

In a possible implementation of the present disclosure, the first image processing mode set may include a first exposure fusion mode and a second exposure fusion mode. The second image processing mode set may include a third exposure fusion mode and a fourth exposure fusion mode. For descriptions and examples of the first exposure fusion mode, the second exposure fusion mode, the third exposure fusion mode, and the fourth exposure fusion mode, refer to related descriptions in the apparatus embodiment of the first aspect. Details are not described herein again.

In a possible implementation, the target image processing mode may be one of the foregoing first exposure fusion mode to fourth exposure fusion mode.

For a processing manner of selecting a target image processing mode based on the status information and the photographing scene information in the embodiment of the third aspect of the present disclosure, refer to related examples and descriptions in the embodiment of the first aspect. Details are not described herein again.

An embodiment of a fourth aspect of the present disclosure discloses an image processing method, where the method includes obtaining status information of a terminal device, selecting a first image processing mode set or a second image processing mode set based on the status information, where an exposure time of any image processing mode in the first image processing mode set is greater than an exposure time of any image processing mode in the second image processing mode set, obtaining photographing scene information of the terminal device, determining a target image processing mode from the first image processing mode set or the second image processing mode set based on the photographing scene information, and obtaining a to-be-displayed image based on the target image processing mode.

In a possible implementation of the present disclosure, the first image processing mode set may include a first exposure fusion mode and a second exposure fusion mode. The second image processing mode set may include a third exposure fusion mode and a fourth exposure fusion mode. For descriptions and examples of the first exposure fusion mode, the second exposure fusion mode, the third exposure fusion mode, and the fourth exposure fusion mode, refer to related descriptions in the apparatus embodiment of the first aspect. Details are not described herein again.

In a possible implementation, the target image processing mode may be one of the foregoing first exposure fusion mode to fourth exposure fusion mode.

For a processing manner of selecting a target image processing mode based on the status information and the photographing scene information in the embodiment of the fourth aspect of the present disclosure, refer to related examples and descriptions in the embodiment of the first aspect. Details are not described herein again.

An embodiment of a fifth aspect of the present disclosure discloses an image processing apparatus, where the apparatus includes one or more processors and a memory. The memory is coupled to the one or more processors, and the memory is configured to store computer program code, where the computer program code includes an instruction, and when the one or more processors execute the instruction, the processing apparatus performs the image processing method according to the foregoing second aspect, the foregoing fourth aspect, any possible implementation of the second aspect or any possible implementation of the fourth aspect.

An embodiment of a sixth aspect of the present disclosure discloses a computer readable storage medium, where the computer readable storage medium stores an instruction, and when the instruction is executed on a device, the device is enabled to perform the image processing method according to the foregoing second aspect, the foregoing fourth aspect, any possible implementation of the second aspect or any possible implementation of the fourth aspect.

An embodiment of a seventh aspect of the present disclosure discloses a processor, where the processor is configured to perform the image processing method according to the foregoing second aspect, the foregoing fourth aspect, any possible implementation of the second aspect or any possible implementation of the fourth aspect.

It should be understood that, for beneficial effects obtained by the second aspect to the seventh aspect and the corresponding implementations of the second aspect to the seventh aspect in this application, refer to beneficial effects obtained by the first aspect and the corresponding implementations of the first aspect in this application. Details are not described herein again.

BRIEF DESCRIPTION OF DRAWINGS

To describe the technical solutions in some of the embodiments of the present disclosure more clearly, the following briefly describes the accompanying drawings that describing some of the embodiments. The accompanying drawings in the following description show merely some embodiments of the present disclosure, and a person of ordinary skill in the art may derive other drawings from these accompanying drawings without creative efforts.

DESCRIPTION OF EMBODIMENTS

The following describes the technical solutions in the embodiments of the present disclosure with reference to the accompanying drawings.

Figure 2:
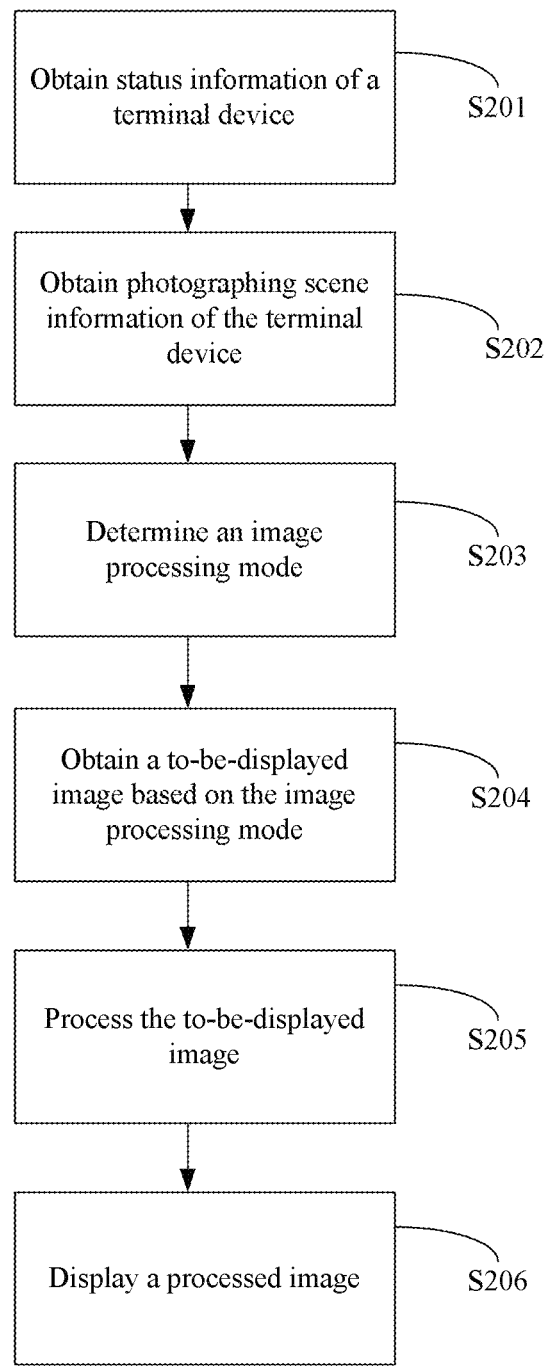
FIG. 2 is a schematic flowchart of an image processing method according to an embodiment of the present disclosure.

FIG. 2 shows an image processing method according to an embodiment of the present disclosure. The method includes the following steps.

Step S201. Obtain status information of a terminal device.

The status information may be information directly collected by a sensor of the terminal device, for example, may be information collected by a device, for example, a gravity sensor or a gyroscope, of the terminal device, or may be information obtained after calculation or other processing performed on the foregoing information. The terminal device may be a device such as a smartphone, a tablet computer, or a notebook computer.

In a possible implementation, a value of acceleration due to gravity may be measured using the gravity sensor, and is used as the status information. In another possible implementation, the gyroscope may be used for measurement to determine whether the terminal device is in a stable state, and posture information of the terminal device collected by the gyroscope is used as the status information.

It can be understood that, before the status information of the terminal device is obtained, the terminal device may further obtain trigger information, where the trigger information may enable the terminal device to enter a preview display mode to present, on a display of the terminal device, an image captured by a camera. The trigger information may be information, for example, a shutter button, formed when a user presses a physical key of a mobile terminal, or may be information, for example, activation of a photographing function of a camera by a tap or a swipe, formed after a user performs a corresponding operation on a touchscreen. In a possible implementation, in the preview display mode, the terminal device presents, on the display, an image captured by the camera, to show the user image content that can be captured by the camera currently to facilitate adjustment of a corresponding framing status by the user. However, at this time, a picture has not been taken yet, and a framed image is not stored in a storage medium of the device. In a photographing mode, after the user finishes framing and presses the shutter button, the device obtains an image captured by the camera, and after processing using a corresponding method, a final photo image is stored in the storage medium of the device. In a possible implementation, the current image is image data captured by the camera of the terminal device in the preview display mode.

Step S202. Obtain photographing scene information of the terminal device.

The photographing scene information of the terminal device is mainly used to represent a dynamic range of a photographing scene, usually in a form of a histogram.

Histograms are widely used in image processing, and a brightness histogram is a chart used to present image brightness distribution, and shows image proportions of objects with different brightness in an image. For example, in a histogram of an image, a horizontal axis represents brightness in the image with gradual transition from black to white from left to right, and a vertical axis represents a relative quantity of pixels within a brightness range in the image.

In the field of image photographing processing, a dynamic range is mainly a brightness range of a photographed object, namely, a range that spans from brightness of a darkest spot to brightness of a brightest spot in the photographed object. In a scene with a large dynamic range, there is a relatively large difference between brightness of a brightest part and brightness of a darkest part, and a picture has a high contrast and rich gradients. In a scene with a small dynamic range, most objects have similar brightness, and a picture has a low contrast. The dynamic range may be quantitatively described by a ratio or a difference.

Figure 1A:
FIGS. 1A, 1B, 1C and 1D are schematic diagrams of histograms and dynamic ranges according to an embodiment of the present disclosure.
Figure 1B:
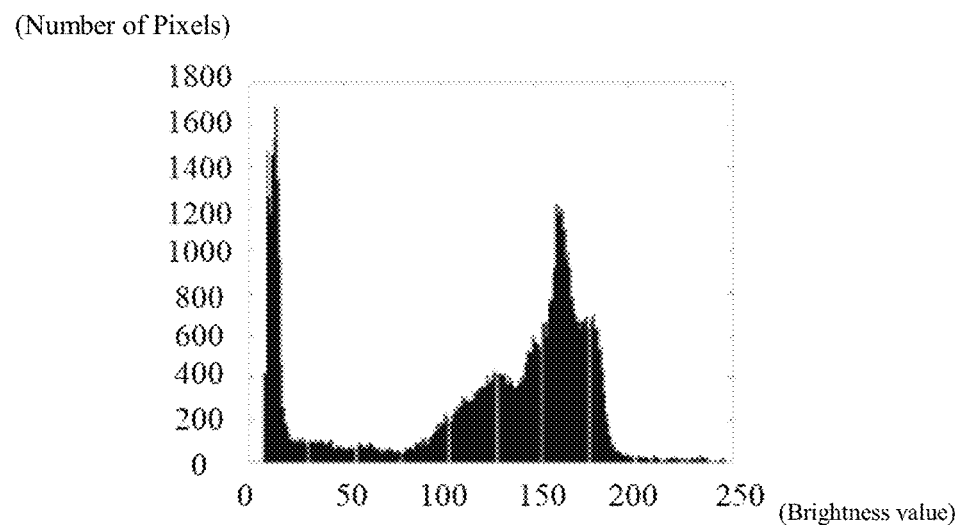
Figure 1C:
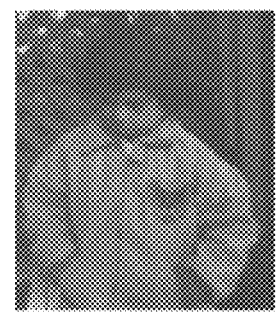
Figure 1D:
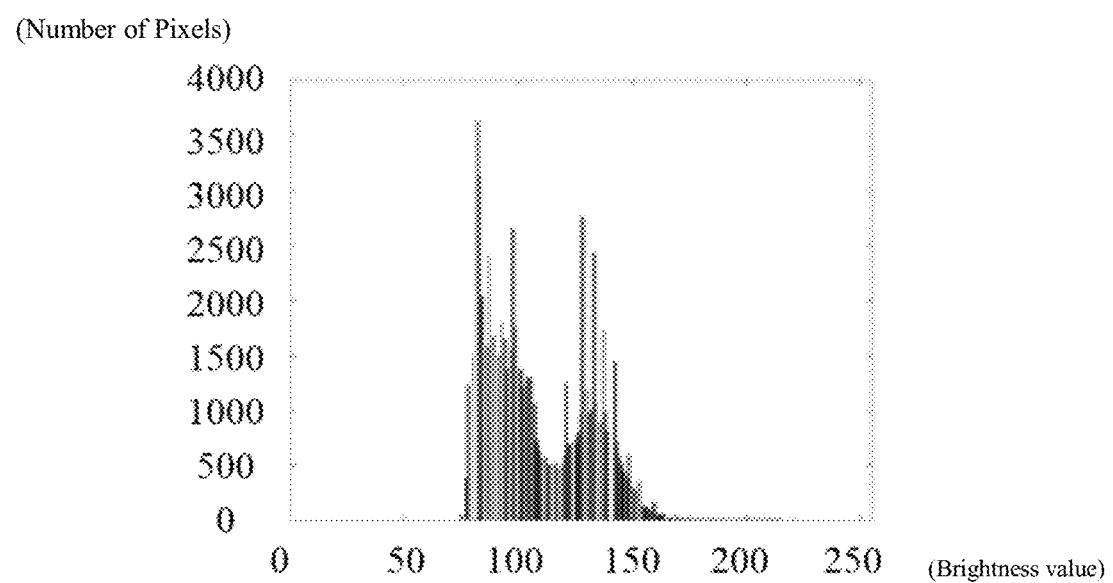

FIGS. 1A, 1B, 1C and 1D show an example of histograms and dynamic ranges. FIG. 1A is a photographed image, and FIG. 1B is a histogram of the image in FIG. 1A. It can be learned from the histogram in FIG. 1B that the image in FIG. 1A has a relatively large brightness range and a relatively high dynamic range. FIG. 1D is a histogram of the image in FIG. 1C. It can be learned from the histogram in FIG. 1D that the image in FIG. 1C has a relatively small brightness range and a relatively low dynamic range.

Step S203. Determine an image processing mode.

In an implementation, after the status information of the terminal device is obtained, whether the terminal device is in a stable state is determined based on the status information.

When the terminal device is in a stationary state or a basically stationary state, for example, is placed on a tripod or another fixing apparatus, it may be considered that the terminal device is in a stable state. When the terminal device is in a moving state or a slightly shaky state, for example, the user holds the terminal device for photographing, or the user holds a fixing apparatus (for example, a selfie stick) of the terminal device for photographing, it may be considered that the terminal device is in a nonstable state. In a possible implementation, whether the terminal device is in a stable state may be determined by comparing the status information with a preset threshold. For example, when a value obtained by the gyroscope is greater than a first threshold, it may be considered that the terminal device is in a nonstable state, or when a value obtained by the gyroscope is less than or equal to a first threshold, it may be considered that the terminal device is in a stable state. A value of the first threshold may be set based on features of the device. A typical stability threshold of a gyroscope of a mobile phone may be set to 0.01.

In an implementation, accuracy of detection can be improved by determining, a plurality of times within a small period of time before photographing, whether the status information is greater than the preset threshold. For example, if the value obtained by the gyroscope exceeds the first threshold twice or more times within a small period of time before photographing, the terminal device is in a nonstable state.

In a possible implementation of the solutions of the present disclosure, a photographing scene is further determined, and an image processing mode to be used is determined based on a status of the terminal device and the dynamic range of the photographing scene.

In a possible implementation, a current photographing scene may be determined using a histogram of a current image. For example, the histogram of the current image is first obtained to calculate an overexposure ratio and an underexposure ratio in the histogram. For example, a pixel whose brightness is greater than 250 is defined as an overexposure pixel, and a pixel whose brightness is less than 10 is defined as an underexposure pixel. An overexposure ratio and an underexposure ratio are calculated. If the overexposure ratio is greater than a preset threshold and the underexposure ratio is greater than another preset threshold, it may be considered that an image has a high dynamic scene. Usually, ratios in a high dynamic range are adjusted based on an actual effect of an algorithm. For example, it is determined that an overexposure ratio is greater than 1% and an underexposure ratio is greater than 5% or 10%. It can be understood that the foregoing values and ratios are merely general examples listed to help understand this embodiment of the present disclosure, and a person of ordinary skill in the art may set other thresholds and values based on parameters of the terminal device.

When a photographing status of the terminal device is stable and the photographing scene of the terminal device is a high dynamic scene, a first exposure fusion mode is determined as the image processing mode, where exposure values of at least two adjacent frames of images are different in the first exposure fusion mode.

In a possible implementation, when the photographing status of the terminal device is stable and the photographing scene of the terminal device is not a high dynamic scene, a second exposure fusion mode is determined as the image processing mode, where exposure values of images are the same in the second exposure fusion mode. For example, the exposure values may all be 40.

For a non-high dynamic scene, the same exposure value is used for processing, and an image of lower noise can be obtained.

In a possible implementation, when the photographing status of the terminal device is unstable and the photographing scene of the terminal device is a high dynamic scene, a third exposure fusion mode is determined as the image processing mode, where exposure values of at least two adjacent frames of images are different in the third exposure fusion mode.

In a possible implementation, when the photographing status of the terminal device is unstable and the photographing scene of the terminal device is not a high dynamic scene, a fourth exposure fusion mode is determined as the image processing mode, where exposure values of images are the same in the fourth exposure fusion mode.

In a possible implementation, an exposure time of the first exposure fusion mode is greater than an exposure time of the third exposure fusion mode.

In a possible implementation, an exposure time of the second exposure fusion mode is greater than an exposure time of the fourth exposure fusion mode.

It can be understood that, "not a high dynamic scene" and "a non-high dynamic scene" have the same meaning in this embodiment of the present disclosure.

In a possible implementation, a quantity of to-be-processed frames of images in the first exposure fusion mode is equal to a quantity of to-be-processed frames of images in the second exposure fusion mode.

In a possible implementation, a quantity of to-be-processed frames of images in the third exposure fusion mode is equal to a quantity of to-be-processed frames of images in the fourth exposure fusion mode.

In a possible implementation, a quantity of to-be-processed frames of images in the first exposure fusion mode or the second exposure fusion mode is greater than a quantity of to-be-processed frames of images in the third exposure fusion mode or the fourth exposure fusion mode.

Step S204. Obtain a to-be-displayed image based on the image processing mode.

Obtaining a to-be-displayed image based on the image processing mode according to this embodiment of the present disclosure may include obtaining, after a quantity of frames of images and exposure parameters corresponding to the frames are determined, the to-be-displayed image using the camera based on the corresponding exposure parameters. Exposure parameters corresponding to different image processing modes are set in different manners.

In a possible implementation, when the image processing mode is the first exposure fusion mode, a maximum exposure value and a minimum exposure value used in photographing are calculated. During calculation of the maximum exposure value, an average value of brightness of relatively dark pixels that account for a specific proportion of a current image is calculated (in a typical embodiment, the darkest 30% of the pixels in the image are selected, and an average value of brightness of these pixels is calculated). If the average value of brightness of the pixels that account for the specific proportion is less than preset target brightness (for example, for an image whose brightness is in a range between 0 and 255, target brightness may be 60 or a proximate value), an exposure value is increased (an exposure value may be increased by increasing an exposure time or increasing a camera gain or sometimes even increasing an aperture, thereby increasing brightness of all pixels) such that the average value of brightness of the selected pixels reaches the target brightness. In this case, an exposure value corresponding to the target brightness is the maximum exposure value. For example, exposure parameters (for example, an exposure time, an aperture value, and an ISO value) corresponding to the maximum exposure value are recorded for setting corresponding exposure parameters during photographing of the to-be-displayed image.

The exposure value is a value calculated based on the exposure parameters (the aperture, the exposure time, the ISO value, and the like), and reflects an amount of light admitted by the camera and the camera gain. A manner of calculating the exposure value may be $L=T*ISO/(A*A)$, where L is the exposure value, T is the exposure time, ISO is an ISO value of the camera, and A is the aperture value.

There is a relationship between the exposure value and image brightness. In a same lighting scene, when the exposure value L is larger, image brightness obtained by the camera is higher.

In a possible implementation, if the average value of brightness of the pixels that account for the specific proportion is not less than a preset target value, the maximum exposure value is an exposure value corresponding to exposure parameters of a current image. The exposure parameters (for example, the exposure time, the aperture value, and the ISO value) of the current image are set as exposure parameters during photographing of the to-be-displayed image.

It can be understood that, a high dynamic scene is a prerequisite for entering the first exposure fusion mode. During determining of a high dynamic scene, the underexposure ratio of the pixels exceeds 5% to 10%. Therefore, brightness of each of the darkest 30% pixels is usually lower than the target brightness, and the preset target value is seldom reached.

According to this embodiment of the present disclosure, a relatively dark specific proportion of an image may be a proportion of pixels. For example, when the image has 100 pixels, in ascending order of brightness values, 30 pixels with the smallest brightness values are selected.

During calculation of the minimum exposure value, an average value of brightness of the brightest pixels that account for a specific proportion of the image is calculated (in an embodiment, the brightest 1% pixels in the image are selected, and an average value of these pixels is calculated). If the average value is greater than a preset threshold (for example, for an image whose brightness is in a range between 0 and 255, the threshold may be 180), an exposure value is decreased until the average value is equal to the preset threshold, and an exposure value in this case is used as the minimum exposure value. If the average value of brightness of the pixels is not greater than the preset threshold, the average value of brightness of the pixels is used as the minimum exposure value.

It can be understood that, a manner of calculating the minimum exposure value is similar to the manner of calculating the maximum exposure value. Usually, 1% overexposure can be met in a high dynamic scene, and therefore, the average value of brightness of such pixels is basically greater than the target value. If the average value of brightness of the pixels is less than the target value, no adjustment is needed, and current exposure parameters are recorded for photographing the to-be-displayed image.

After the maximum exposure value and the minimum exposure value are obtained, a quantity of required frames of images with different exposures is calculated based on a ratio of the maximum exposure value to the minimum exposure value.

During calculation of the quantity of required frames of images with different exposures, a step size may be first preset. A relatively small step size is set in a first fusion processing mode. For example, the step size may be 1.5. It can be understood that, a larger step size may be set herein. If the step size is larger, fewer frames of images are to be taken, photographing is faster, and a picture is less likely to blur.

In each fusion processing mode, the step size has a relatively fixed value, and a specific value of the step size may be set differently based on the parameters of the terminal device. For example, a smaller step size may be set for a device with optical image stabilization, and a larger step size may be set for another device. A typical value is between 1.5 and 2.0.

After the step size is obtained, the minimum exposure value is multiplied by the corresponding step size. If an exposure value obtained after the minimum exposure value is multiplied by the step size N times is greater than the maximum exposure value, a final quantity of frames of images with different exposures is determined as N, where N is a positive integer. For example, if the minimum exposure value is 10, the maximum exposure value is 60, and the step size is 1.5, N is 5.

For example:

$10 \times 1.5 = 15$;

$15 \times 1.5 = 22.5$;

$22.5 \times 1.5 = 33.75$;

$33.75 \times 1.5 = 50.625$; and $50.625 \times 1.5 = 75.9375$.

The foregoing N frames of images obtained after calculation have different exposure values.

After the N frames of images are calculated, a quantity of required images with a maximum exposure is further calculated. Exposure values of these frames are the same and are all the maximum exposure value.

In an example, in a method for calculating the quantity of images with a maximum exposure, a brightness value of the image with the maximum exposure is used to perform nonlinear accumulation, and if an average value of brightness of the images obtained after accumulation by M frames of images reaches the preset target value (when the terminal device is in a stable state, the target value may be set to 80), M is the quantity of frames of images required for the maximum exposure value. A final quantity of frames of images that need to be processed is N+M, where M is a positive integer. The average brightness of the images herein is an average value of brightness of pixels in a frame of image.

In an example, in a process of the nonlinear accumulation, based on a current image frame, when an input frame of image is received, an accumulation coefficient is set based on a brightness value of the current image, and the accumulation coefficient is inversely proportional to a brightness value of a pixel in the image frame. When the brightness value of the image is larger, the accumulation coefficient is smaller. The coefficient is multiplied by the brightness value of the input image, and a result of multiplication is added to the brightness value of the current image, to obtain an accumulation result. In an example, a brightness value of a pixel in the current image is 100, and a corresponding accumulation coefficient is 0.3. If brightness of a pixel point with the same coordinates in the to-be-displayed image is 80, pixel brightness obtained after accumulation is 100+0.3× 80=124. A brightness value of another pixel in the current image is 60, the accumulation coefficient of the pixel is 0.5, and brightness of a corresponding pixel at a same position in the input image is 40. In this case, brightness obtained after accumulation is 60+0.5×40=80.

In a possible implementation of the present disclosure, when the image processing mode is the second exposure fusion mode, required exposure values are first calculated, and an average value in the brightest area in the current image is calculated, for example, an average value of the brightest 1% pixels in the image in the current image is calculated. If the average value is greater than specified target brightness, the exposure value is decreased to make the average value reach the target brightness. Usually, if the brightness is greater than the target value, to improve effects, it is strongly recommended to lower the exposure value. In a possible implementation, the average value of brightness of pixels may be directly used as the target value. In a possible implementation, exposure parameters corresponding to current exposure values are used to take the to-be-displayed image without determining whether the average brightness value reaches the target brightness value or when the average brightness value is less than or equal to the target value.

The quantity of required frames of images is calculated based on a camera gain of a current scene, and when the camera gain is larger, there are more frames of images. In an example of calculating a quantity of frames of images, for example, four frames of images are used when the gain is below 400 (ISO), eight frames of images are used when the gain is between 400 and 1600, and 16 frames of images are used when the gain is between 1600 and 3200. The quantity of images is settable.

In a possible implementation of the present disclosure, processing of the third exposure fusion mode is roughly similar to that of the first exposure fusion mode, and a main difference lies in the target brightness used to calculate the maximum exposure value and the minimum exposure value and in settings of the step sizes during calculation of the quantity of frames of images.

Target brightness corresponding to the maximum exposure value when the terminal device is in a nonstable state is less than target brightness corresponding to the maximum exposure value when the terminal device is in a stable state. For example, the target brightness may be set to 40 when the terminal device is in a nonstable state, and the target brightness may be set to 60 when the terminal device is in a stable state. Target brightness corresponding to the minimum exposure value when the terminal device is in a nonstable state is greater than target brightness corresponding to the minimum exposure value when the terminal device is in a stable state. For example, the target brightness may be set to 200 when the terminal device is in a nonstable state. The target brightness may be set to 180 when the terminal device is in a stable state.

The step size during calculation of the quantity of frames of images when the terminal device is in a nonstable state may be set to a value larger than that when the terminal device is in a stable state. For example, the step size is set to 1.5 when the terminal device is in a stable state, and the step size is set to 2.0 when the terminal device is in a nonstable state. If the step size is larger, fewer frames of images are to be taken, photographing is faster, and a picture is less likely to blur. An accumulated target brightness value during calculation of a quantity of frames of images with a maximum exposure when the terminal device is in a nonstable state is less than that when the terminal device is in a stable state. For example, the accumulated target brightness value may be set to 80 when the terminal device is in a stable state, and the accumulated target brightness value may be set to 60 when the terminal device is in a nonstable state.

In a possible implementation, the exposure time of the first exposure fusion mode is greater than the exposure time of the third exposure fusion mode. For example, a maximum exposure time of a frame corresponding to the maximum exposure value in the first exposure fusion mode is one second, and a maximum exposure time of a frame corresponding to the maximum exposure value in the third exposure fusion mode is 250 milliseconds. In addition, to implement a specific exposure value, in the first exposure fusion mode, a relatively long exposure time is used, and a relatively small ISO value and a relatively small aperture value are used. For example, an exposure time of 500 milliseconds and an ISO value of 100 are used. In the third mode, to implement the same exposure value, a relatively short exposure time is used, and a relatively large ISO value and a relatively large aperture value are used. For example, a combination of an exposure time of 100 milliseconds and an ISO value of 500 is used.

In a possible implementation of the present disclosure, processing of the fourth exposure fusion mode is roughly similar to that of the second exposure fusion mode, and a main difference lies in a target brightness value and an exposure time.

In a possible implementation, an exposure time of the second exposure fusion mode is greater than an exposure time of the fourth exposure fusion mode. For example, a maximum exposure time of a frame corresponding to a maximum exposure value in the second exposure fusion mode is two seconds, and a maximum exposure time of a frame corresponding to a maximum exposure value in the fourth exposure fusion mode is one second. In addition, to implement a specific exposure value, in the second exposure fusion mode, a relatively long exposure time is used, and a relatively small ISO value and a relatively small aperture value are used. For example, an exposure time of 500 milliseconds and an ISO value of 100 are used. In the fourth mode, to implement the same exposure value, a relatively short exposure time is used, and a relatively large ISO value and a relatively large aperture value are used. For example, a combination of an exposure time of 100 milliseconds and an ISO value of 500 is used.

For example, when the image processing mode is the third exposure fusion mode, a maximum exposure value and a minimum exposure value used in photographing are calculated. During calculation of the maximum exposure value, an average value of brightness of relatively dark pixels that account for a specific proportion of the image is calculated (In a typical embodiment, the darkest 30% of the pixels in the image are selected, and an average value of brightness of these pixels is calculated). If the average value of brightness of the pixels that account for the specific proportion is less than a preset target value (for example, for an image whose brightness is in a range between 0 and 255, target brightness may be 40 or a proximate value), an exposure value is increased (an exposure value may be increased by increasing an exposure time or increasing a camera gain or sometimes even increasing an aperture, thereby increasing brightness of all pixels) such that the exposure value reaches the target value. For example, exposure parameters (for example, an exposure time, an aperture value, and an ISO value) corresponding to the maximum exposure value are recorded for setting corresponding exposure parameters during photographing of the to-be-displayed image.

In a possible implementation, if the average value of brightness of the pixels that account for the specific proportion is not less than a preset target value, the maximum exposure value is an exposure value corresponding to exposure parameters of a current image. The exposure parameters (for example, the exposure time, the aperture value, and the ISO value) of the current image are set as exposure parameters during photographing of the to-be-displayed image.

It can be understood that, a high dynamic scene is a prerequisite for entering the third exposure fusion mode. During determining of a high dynamic scene, the underexposure ratio of the pixels exceeds 5% to 10%. Therefore, brightness of each of the darkest 30% pixels is usually lower than the target brightness, and the preset target value is seldom reached.

According to this embodiment of the present disclosure, a relatively dark specific proportion of an image may be a proportion of pixels. For example, when the image has 100 pixels, in ascending order of brightness values, 30 pixels with the smallest brightness values are selected.

During calculation of the minimum exposure value, an average value of brightness of the brightest pixels that account for a specific proportion of the image is calculated (in an embodiment, the brightest 1% pixels in the image are selected, and an average value of these pixels is calculated). If the average value is greater than a preset threshold (for example, for an image whose brightness is in a range between 0 and 255, the threshold may be 180), an exposure value is decreased until the average value is equal to the preset threshold, and an exposure value in this case is used as the minimum exposure value. If the average value of brightness of the pixels is not greater than the preset threshold, the average value of brightness of the pixels is used as the minimum exposure value.

It can be understood that, a manner of calculating the minimum exposure value is similar to the manner of calculating the maximum exposure value. Usually, 1% overexposure can be met in a high dynamic scene, and therefore, the average value of brightness of such pixels is basically greater than the target value. If the average value of brightness of the pixels is less than the target value, no adjustment is needed, and current exposure parameters are recorded for photographing the to-be-displayed image.

After the maximum exposure value and the minimum exposure value are obtained, a quantity of required frames of images with different exposures is calculated based on a ratio of the maximum exposure value to the minimum exposure value.

During calculation of the quantity of required frames of images with different exposures, a step size may be preset. A relatively small step size is set in a first fusion processing mode. For example, the step size may be 2. It can be understood that, a larger step size may be set herein. If the step size is larger, fewer frames of images are to be taken, photographing is faster, and a picture is less likely to blur.

In each fusion processing mode, the step size has a relatively fixed value, and a specific value of the step size may be set differently based on the parameters of the terminal device. For example, a smaller step size may be set for a device with optical image stabilization, and a larger step size may be set for another device. A typical value is between 1.5 and 2.0.

After the step size is obtained, the minimum exposure value is multiplied by the corresponding step size. If an exposure value obtained after the minimum exposure value is multiplied by the step size N times is greater than the maximum exposure value, a final quantity of frames of images with different exposures is determined as N, where N is a positive integer. For example, if the minimum exposure value is 10, the maximum exposure value is 40, and the step size is 2, N is 3.

The foregoing N frames of images obtained after calculation have different exposure values.

After the N frames of images are calculated, a quantity of required images with a maximum exposure is further calculated. Exposure values of these frames are the same and are all the maximum exposure value.

In an example, in a method for calculating the quantity of images with a maximum exposure, a brightness value of the image with the maximum exposure is used to perform nonlinear accumulation, and if average brightness of the images obtained after accumulation by M frames of images reaches the preset target value (when the terminal device is in a stable state, the target value may be set to 80), M is the quantity of frames of images required for the maximum exposure value. A final quantity of frames of images that need to be processed is N+M, where M is a positive integer.

In an example, in a process of the nonlinear accumulation, based on a current image frame, when an input frame of image is received, an accumulation coefficient is set based on a brightness value of the current image, and the accumulation coefficient is inversely proportional to a brightness value of a pixel in the image frame. When the brightness value of the image is larger, the accumulation coefficient is smaller. The coefficient is multiplied by the brightness value of the input image, and a result of multiplication is added to the brightness value of the current image, to obtain an accumulation result. In an example, a brightness value of a pixel in the current image is 100, and a corresponding accumulation coefficient is 0.3. If brightness of a pixel point with the same coordinates in a received input image is 80, pixel brightness obtained after accumulation is 100+0.3× 80=124. A brightness value of another pixel in the current image is 60, the accumulation coefficient of the pixel is 0.5, and brightness of a corresponding pixel at a same position in the input image is 40. In this case, brightness obtained after accumulation is 60+0.5×40=80.

In a possible implementation of the present disclosure, when the image processing mode is the fourth exposure fusion mode, required exposure values are first calculated, and an average value in the brightest area in the current image is calculated, for example, an average value of the brightest 1% pixels in the image in the current image is calculated. If the average value is greater than specified target brightness, the exposure value is decreased to make the average value reach the target brightness. Usually, if the brightness is greater than the target value, to improve effects, it is strongly recommended to lower the exposure value. In a possible implementation, exposure parameters corresponding to current exposure values are used to take the to-be-displayed image without determining whether the average brightness value reaches the target brightness value or when the average brightness value is less than or equal to the target value.

The quantity of required frames of images is calculated based on a camera gain of a current scene, and when the camera gain is larger, there are more frames of images. In an example of calculating a quantity of frames of images, for example, four frames of images are used when the gain is below 400 (ISO), eight frames of images are used when the gain is between 400 and 1600, and 16 frames of images are used when the gain is between 1600 and 3200. The quantity is settable.

A quantity of frames of images to be taken in a photographing cycle in the fourth exposure fusion mode may be the same as or different from that in the second exposure fusion mode.

In a possible implementation, the to-be-displayed image may be an image that needs to be captured by the camera when the user presses the shutter button. The shutter button may be a physical key or a virtual key on a touchscreen. In some examples, photographing may be triggered by capturing a voice instruction or an action of the user instead of being triggered by the shutter button. In this case, data captured by the camera is a to-be-displayed image.

In an example, the to-be-displayed image may include a plurality of frames of images taken by the camera after the photographing function is triggered. The to-be-displayed image may be the first frame of image taken by the camera after the photographing function is triggered, or may be the last frame of image taken by the camera in a photographing cycle after the photographing function is triggered, or may be an image taken by the camera at an intermediate moment in a photographing cycle after the photographing function is triggered. The photographing cycle in the example may be a photographing time period for a plurality of frames of images to be taken in an exposure fusion mode. For example, 10 frames of images need to be taken in the first exposure fusion mode, and the current to-be-displayed image may be the first frame of image, the fourth frame of image, or the tenth frame of image.

In a possible implementation, the image processing method according to this embodiment of the present disclosure further includes the following steps.

Step S205. Process the to-be-displayed image.

In an example, after the camera performs photographing based on the required exposure values, a brightness value of each pixel in a frame of image of a to-be-displayed image obtained from photographing each time is added to a brightness value of the pixel in a previous frame of image, and an average result of the brightness values is displayed on the screen.

In a possible implementation, when the last image is received or the processing is terminated in advance, an average of accumulated images is computed, noise reduction and dynamic range correction are performed, and a final frame of image is output after image signal processing (ISP) processing for display on the display.

Step S206. Display a processed image. In a possible implementation, each time the terminal device receives a frame of image, the terminal device merges the frame of image and a processing result of a previous frame of image into an image, and displays a current processing result on the screen for preview until the user ends the processing in advance, but the current image is not stored in the storage medium. Alternatively, after all frames are processed, a final result is stored in the device as a final output for preview by the user. It can be understood that, the terminal device may present the final merged image on the display after the processing is finished. Alternatively, instead of presenting the final merged image immediately, the terminal device may present the final merged image on the display when the user browses images subsequently.

In an embodiment, the following process is performed.

1. For first N frames of images with different exposures, each time a frame of image is processed, HDR fusion is performed on a brightness value of a current processed frame and a result from a previous frame, and a fusion result is displayed. In addition, a brightness value of the current processed frame is nonlinearly accumulated to an accumulation result from the previous frame, but an obtained accumulation result is neither displayed nor used for fusion.

2. For M frames with the same exposure, each input frame is first accumulated to a previous accumulation result, the HDR fusion is performed on an obtained accumulation result and an HDR fusion result from a previous frame, and an obtained fusion result is displayed.

In a possible implementation of this embodiment of the present disclosure, when images with the same exposure after the maximum exposure are received, frames of images are nonlinearly accumulated, and an image pyramid is built using accumulation results and is merged with an existing pyramid. Each time a frame of image is received, the built pyramid is rebuilt, and an obtained image is displayed on the screen. The image pyramid is an existing technology used in HDR multi-frame fusion, where images are divided into different image layers based on frequency, weighted summation is performed on image layers corresponding to two images, and results of the layers are superimposed into an image. When the last frame of image is received, or an application is terminated in advance, pyramid rebuilding is performed on the image, to obtain a final output image.

It can be understood that in the foregoing examples, in some cases, a display step in step S206 is not necessarily performed after step S205.

Figure 3:
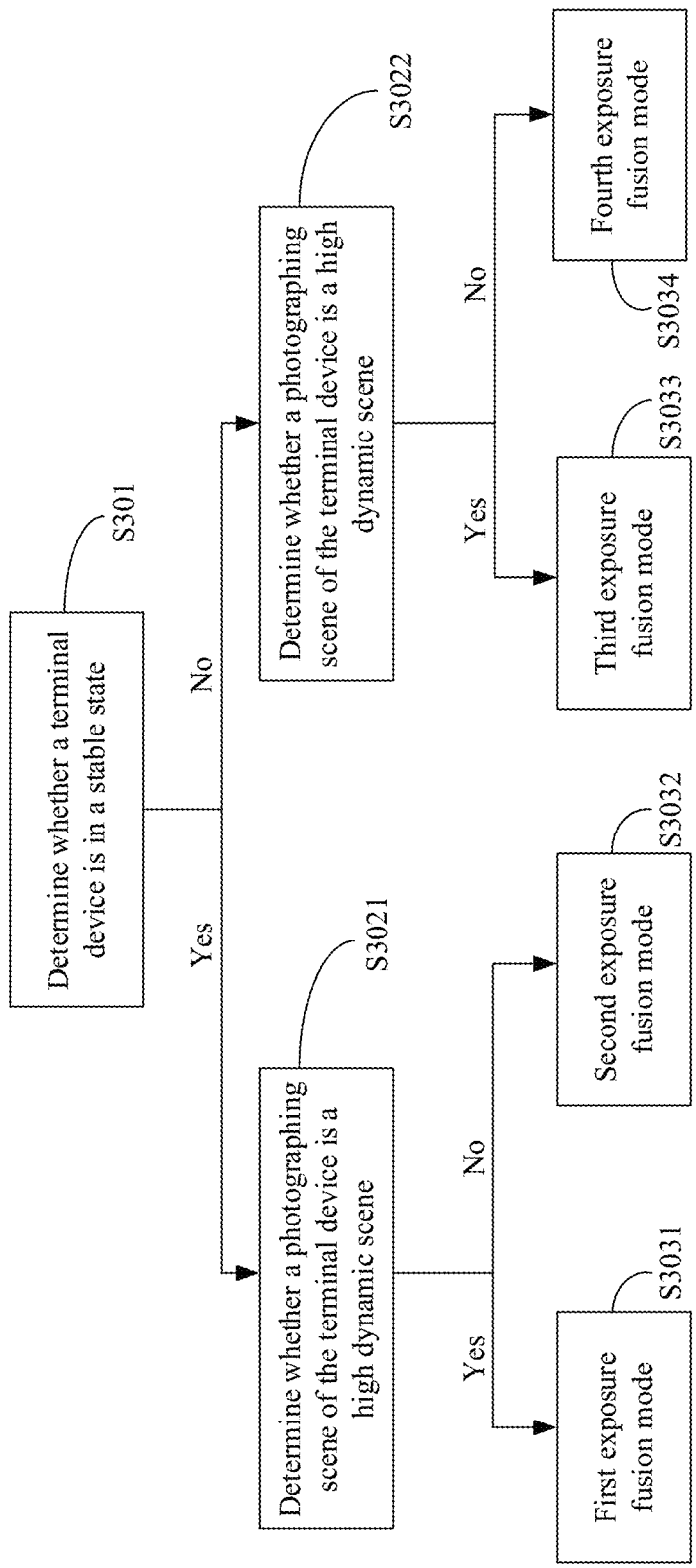
FIG. 3 is a schematic flowchart of another image processing method according to an embodiment of the present disclosure.

The following further describes the image processing method in this embodiment of the present disclosure with reference to FIG. 3. As shown in FIG. 3, the method includes the following steps.

Step S301. Determine whether the terminal device is in a stable state.

In a possible implementation, the status information may be information directly collected by a sensor of the terminal device, for example, may be information collected by a device, for example, a gravity sensor or a gyroscope, of the terminal device, or may be information obtained after calculation or other processing performed on the foregoing information. The terminal device may be a device such as a smartphone, a tablet computer, or a notebook computer.

In a possible implementation, a value of acceleration due to gravity may be measured using the gravity sensor, and is used as the status information. In another possible implementation, the gyroscope may be used for measurement to determine whether the terminal device is in a stable state, and posture information of the terminal device collected by the gyroscope is used as the status information.

After the status information of the terminal device is obtained, whether the terminal device is in a stable state is determined based on the status information.

When the terminal device is in a stationary state or a basically stationary state, for example, is placed on a tripod or another fixing apparatus, it may be considered that the terminal device is in a stable state. When the terminal device is in a moving state or a slightly shaky state, for example, the user holds the terminal device for photographing, or the user holds a fixing apparatus (for example, a selfie stick) of the terminal device for photographing, it may be considered that the terminal device is in a nonstable state. In a possible implementation, whether the terminal device is in a stable state may be determined by comparing the status information with a preset threshold. For example, when a value obtained by the gyroscope is greater than a first threshold, it may be considered that the terminal device is in a nonstable state, or when a value obtained by the gyroscope is less than or equal to a first threshold, it may be considered that the terminal device is in a stable state. A value of the first threshold may be set based on features of the device. A typical stability threshold of a gyroscope of a mobile phone may be set to 0.008, 0.01, 0.011 or the like.

Steps S3021 or S3022. Determine whether a photographing scene of the terminal device is a high dynamic scene.

In a possible implementation, for steps S3021 or S3022, refer to related examples in the foregoing FIG. 2. Details are not described herein again.

Steps S3031, S3032, S3033, and S3034. Obtain a to-be-displayed image using one of the first exposure fusion mode to the fourth exposure fusion mode.

In a possible implementation, for steps S3031, S3032, S3033, and S3034, refer to related examples in the foregoing FIG. 2. Details are not described herein again.

Figure 4:
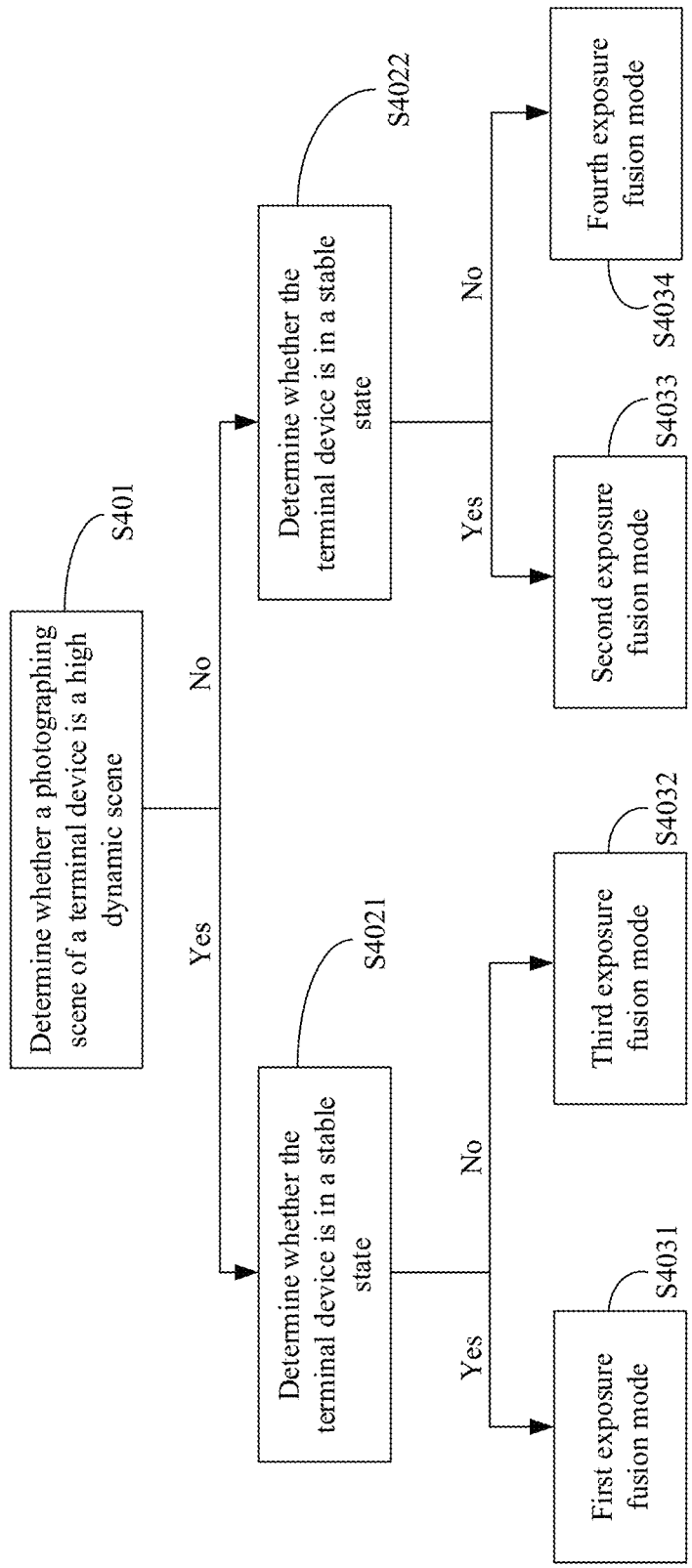
FIG. 4 is a schematic flowchart of still another image processing method according to an embodiment of the present disclosure.

The following further describes the image processing method in this embodiment of the present disclosure with reference to FIG. 4. As shown in FIG. 4, the method includes the following steps.

Step S401. Determine whether a photographing scene of the terminal device is a high dynamic scene.

In a possible implementation, for step S401, refer to related examples in the foregoing FIG. 2. Details are not described herein again.

Steps S4021 or S4022. Determine whether the terminal device is in a stable state.

In a possible implementation, the status information may be information directly collected by a sensor of the terminal device, for example, may be information collected by a device, for example, a gravity sensor or a gyroscope, of the terminal device, or may be information obtained after calculation or other processing performed on the foregoing information. The terminal device may be a device such as a smartphone, a tablet computer, or a notebook computer.

In a possible implementation, a value of acceleration due to gravity may be measured using the gravity sensor, and is used as the status information. In another possible implementation, the gyroscope may be used for measurement to determine whether the terminal device is in a stable state, and posture information of the terminal device collected by the gyroscope is used as the status information.

After the status information of the terminal device is obtained, whether the terminal device is in a stable state is determined based on the status information.

When the terminal device is in a stationary state or a basically stationary state, for example, is placed on a tripod or another fixing apparatus, it may be considered that the terminal device is in a stable state. When the terminal device is in a moving state or a slightly shaky state, for example, the user holds the terminal device for photographing, or the user holds a fixing apparatus (for example, a selfie stick) of the terminal device for photographing, it may be considered that the terminal device is in a nonstable state. In a possible implementation, whether the terminal device is in a stable state may be determined by comparing the status information with a preset threshold. For example, when a value obtained by the gyroscope is greater than a first threshold, it may be considered that the terminal device is in a nonstable state, or when a value obtained by the gyroscope is less than or equal to a first threshold, it may be considered that the terminal device is in a stable state. A value of the first threshold may be set based on features of the device. A typical stability threshold of a gyroscope of a mobile phone may be set to 0.008, 0.01, 0.011 or the like.

Steps S4031, S4032, S4033, and S4034. Obtain a to-be-displayed image using one of the first exposure fusion mode to the fourth exposure fusion mode.

In a possible implementation, for steps S4031, S4032, S4033, and S4034, refer to related examples in the foregoing FIG. 2. Details are not described herein again.

Figure 5:
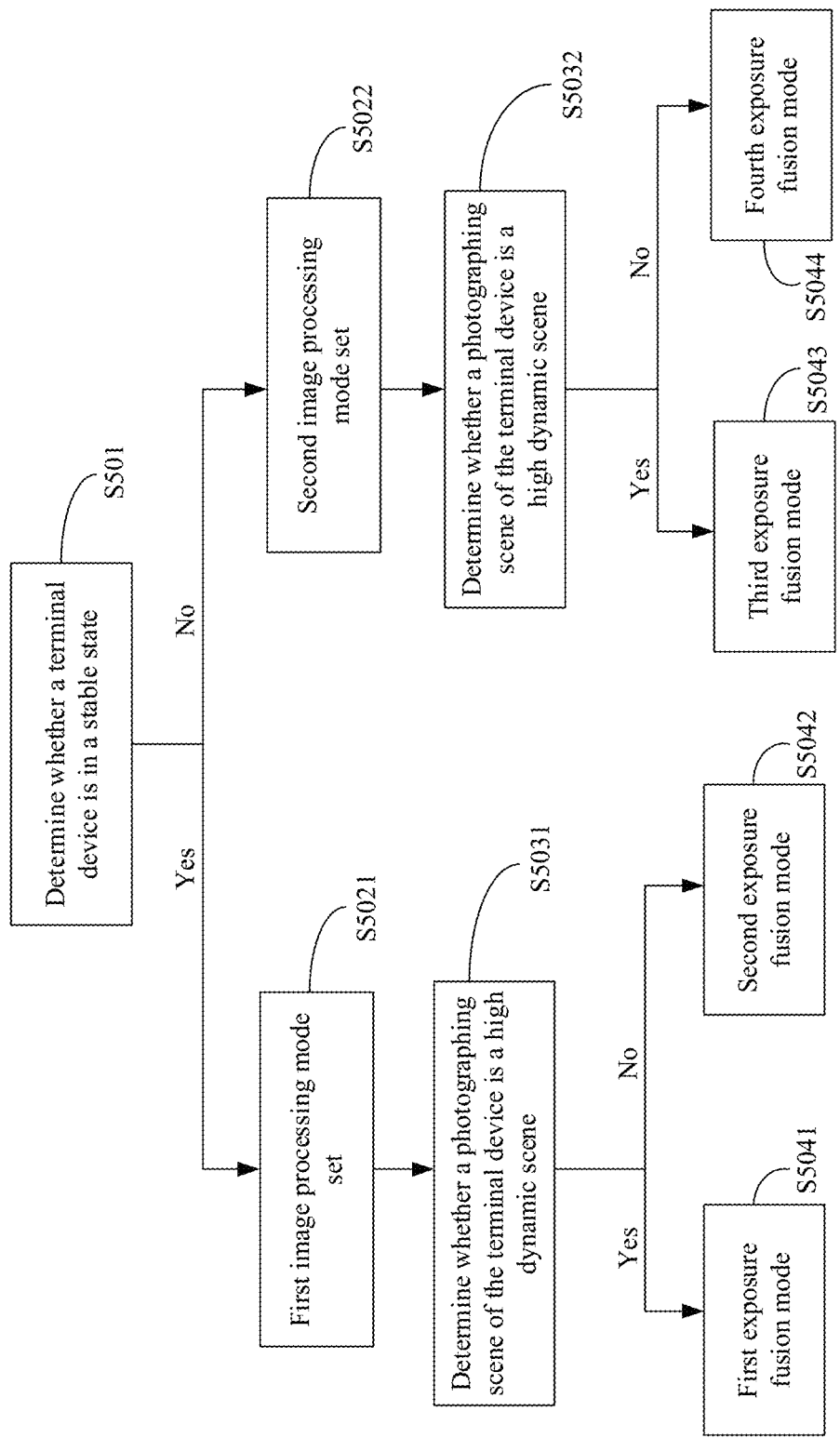
FIG. 5 is a schematic flowchart of yet another image processing method according to an embodiment of the present disclosure.

The following describes an image processing method in an embodiment of the present disclosure with reference to FIG. 5. As shown in FIG. 5, the method includes the following steps.

Step S501. Determine whether a terminal device is in a stable state.

In a possible implementation, for step S501, refer to related examples in the foregoing FIG. 2. Details are not described herein again.

Steps S5021 or S5022. Determine a first image processing mode set or a second image processing mode set.

In a possible implementation, the first image processing mode set includes a first exposure fusion mode and a second exposure fusion mode, and the second image processing mode set includes a third exposure fusion mode and a fourth exposure fusion mode.

Step S5031 or S5032. Determine whether a photographing scene of the terminal device is a high dynamic scene.

In a possible implementation, for step S5031 or S5032, refer to related examples in the foregoing FIG. 2. Details are not described herein again.

Steps S5041, S5042, S5043, and S5044. Obtain a to-be-displayed image using one of the first exposure fusion mode to the fourth exposure fusion mode.

In a possible implementation, for steps S5041, S5042, S5043, and S5044, refer to related examples in the foregoing FIG. 2. Details are not described herein again.

It can be understood that, during an execution process of this embodiment of the present disclosure, a to-be-used image processing mode may be determined based on status information without determining a status of the terminal device. For example, when a value obtained by a gyroscope is greater than a first threshold, image photographing processing is performed using an exposure fusion mode in the second image processing mode set, or when a value obtained by a gyroscope is less than or equal to a first threshold, image photographing processing is performed using an exposure fusion mode in the first image processing mode set. A value of the first threshold may be 0.01, namely, a common stability threshold of a gyroscope of a mobile phone. An exposure time of an image in the first image processing mode set is greater than an exposure time of an image in the second image processing mode set. In some implementations, a quantity of to-be-processed frames of images in the first image processing mode set is greater than a quantity of to-be-processed frames of images in the second image processing mode set, and therefore a processing time of processing all the frames in the first image processing mode set is greater than a processing time of processing all the frames in the second image processing mode set.

Figure 6:
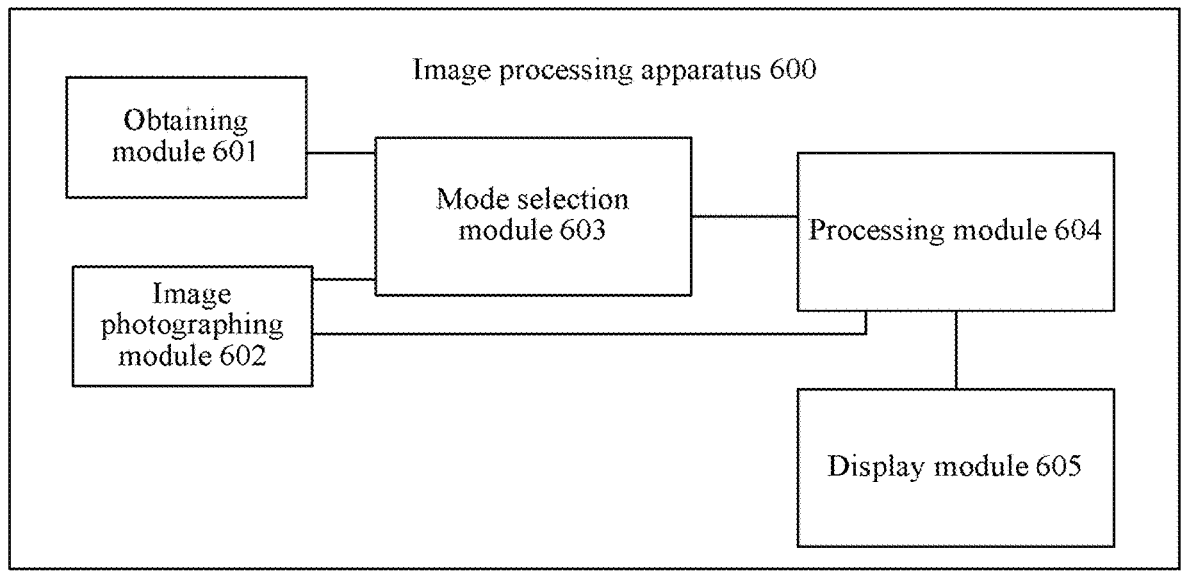
FIG. 6 is a schematic structural diagram of an image processing apparatus according to an embodiment of the present disclosure.

The following describes an image processing apparatus in an embodiment of the present disclosure with reference to FIG. 6. As shown in FIG. 6, the image processing apparatus 600 includes an obtaining module 601, an image photographing module 602, a mode selection module 603, a processing module 604, and a display module 605, where the mode selection module 603 is connected to both the obtaining module 601 and the image photographing module 602, the processing module 604 is connected to both the image photographing module 602 and the mode selection module 603, and the display module 605 is connected to the processing module 604.

The obtaining module 601 is configured to obtain status information of a terminal device, the image photographing module 602 is configured to obtain photographing scene information of the terminal device, the mode selection module 603 is configured to determine an image processing mode based on the status information and the photographing scene information, the image photographing module 602 is further configured to obtain a to-be-displayed image based on the image processing mode, the processing module 604 is configured to process the to-be-displayed image, to obtain a processed image, and the display module 605 is configured to display the processed image.

For implementations of the modules in the image processing apparatus 600, refer to related examples and descriptions in the foregoing method embodiments. Details are not described herein again.

Figure 7:
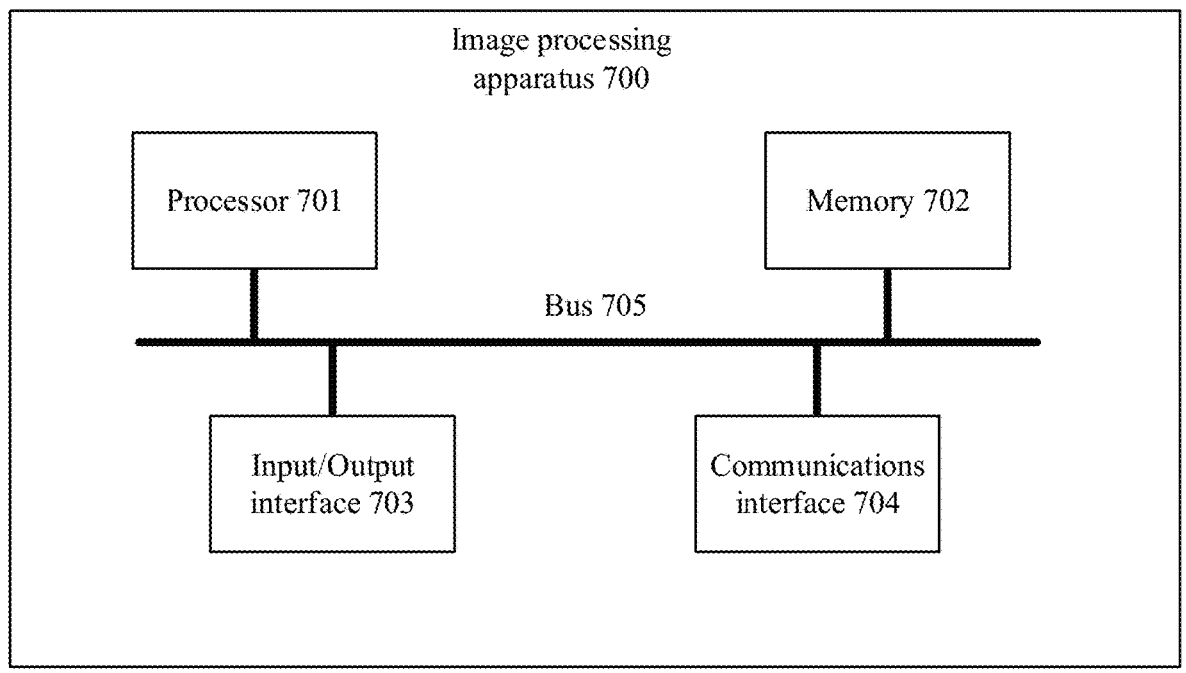
FIG. 7 is a schematic structural diagram of another image processing apparatus according to an embodiment of the present disclosure.

FIG. 7 is a schematic structural diagram of an image processing apparatus according to an embodiment of this application. The apparatus 700 shown in FIG. 7 may be considered as a computer device, and the apparatus 700 may be an implementation of the image processing apparatus in the embodiments of this application, or may be an implementation of the image processing methods in the embodiments of this application. The apparatus 700 includes a processor 701, a memory 702, an input/output interface 703, and a bus 705, and may further include a communications interface 704. The processor 701, the memory 702, the input/output interface 703, and the communications interface 704 are communicatively connected to each other using the bus 705.

The processor 701 may be a general-purpose central processing unit (CPU), a microprocessor, an application-specific integrated circuit (ASIC), or one or more integrated circuits, to execute a related program to implement functions that need to be performed by the modules in the image processing apparatus in the embodiments of this application, or to perform the image processing methods in the method embodiments of this application. The processor 701 may be an integrated circuit chip and has a signal processing capability. In an implementation process, steps in the foregoing methods can be implemented using a hardware integrated logical circuit in the processor 701 or using instructions in a software form. The processor 701 may be a general-purpose processor, a digital signal processor (DSP), an ASIC, a field programmable gate array (FPGA) or another programmable logic device, a discrete gate or transistor logic device, or a discrete hardware component. The processor 701 may implement or perform the methods, steps, and logical block diagrams that are disclosed in the embodiments of this application. The general-purpose processor may be a microprocessor, or the processor may be any conventional processor, or the like. Steps of the methods disclosed with reference to the embodiments of this application may be directly executed and implemented by means of a hardware decoding processor, or may be executed and implemented using a combination of hardware in the decoding processor and a software module. The software module may be located in a mature storage medium in the art, such as a random access memory, a flash memory, a read-only memory (ROM), a programmable ROM (PROM), an electrically erasable PROM (EEPROM), or a register. The storage medium is located in the memory 702, and the processor 701 reads information in the memory 702 and combines the information with the hardware of the processor 702 to implement the functions that need to be performed by the modules included in the image processing apparatus in the embodiments of this application, or to perform the image processing methods in the method embodiments of this application.

The memory 702 may be a ROM, a static storage device, a dynamic storage device or a random access memory (RAM). The memory 702 may store an operating system and another application program. When the functions that need to be performed by the modules included in the image processing apparatus in the embodiments of this application are performed using software or firmware, or the image processing methods in the method embodiments of this application are performed using software or firmware, program code that is used to implement the technical solutions provided by the embodiments of this application is stored in the memory 702, and the processor 701 performs the functions that need to be performed by the modules included in the image processing apparatus, or performs the image processing methods in the method embodiments of this application.

The input/output interface 703 is configured to receive input data and information, and output data such as an operation result.

The communications interface 704 uses a transceiver apparatus, for example, but not limited to, a transceiver, to implement communication between the apparatus 700 with another device or another communications network. The communications interface 704 may be used as an obtaining module or a sending module in the processing apparatus.

The bus 705 may include a path on which information is transferred between components (for example, the processor 701, the memory 702, the input/output interface 703, and the communications interface 704) of the apparatus 700.

It should be noted that, although only the processor 701, the memory 702, the input/output interface 703, the communications interface 704, and the bus 705 of the apparatus 700 are shown in FIG. 7, in a specific implementation process, a person skilled in the art should understand that the apparatus 700 further includes another component required for normal operation, for example, may further include a display that is configured to display to-be-played video data. In addition, according to a specific requirement, a person skilled in the art should understand that the apparatus 700 may further include hardware components for implementing other additional functions. In addition, a person skilled in the art should understand that the apparatus 700 may include only devices required for implementation of the embodiments of this application, but does not necessarily include all the devices shown in FIG. 7.

Figure 8:
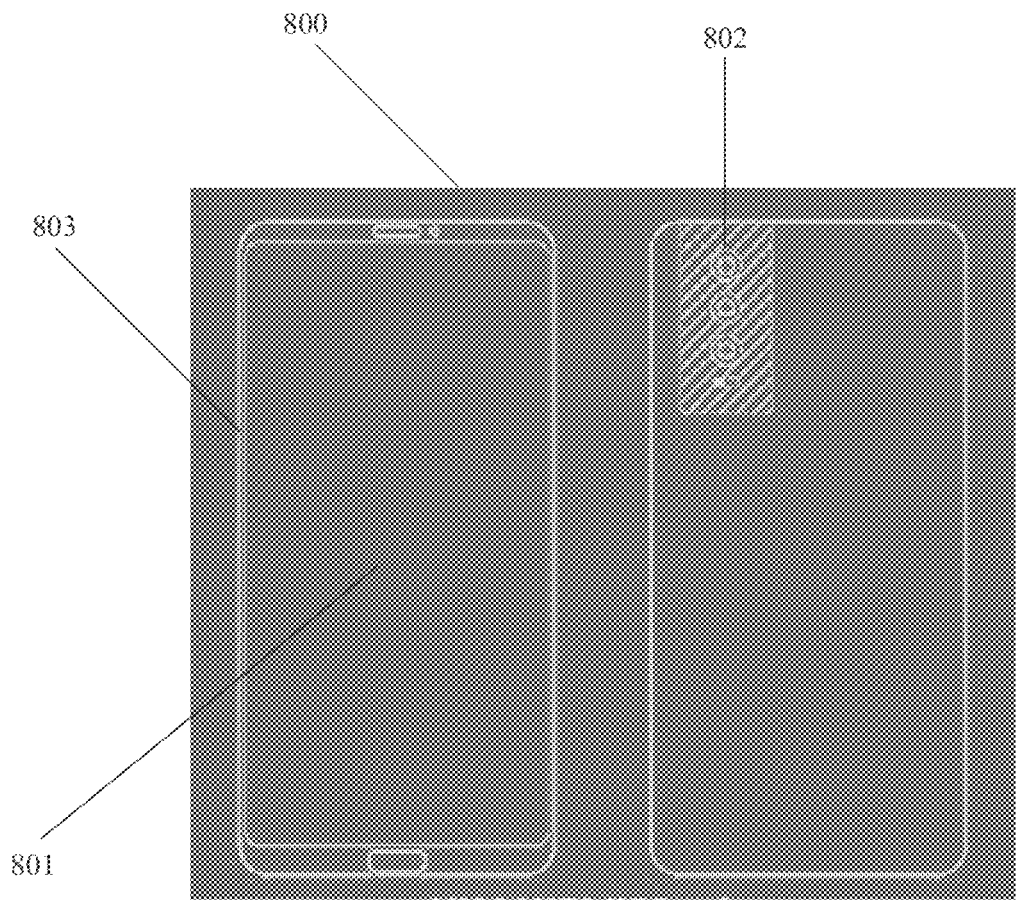
FIG. 8 is a schematic structural diagram of a terminal device used for image processing according to an embodiment of the present disclosure.

The following describes a terminal device for image processing in an embodiment of the present disclosure with reference to FIG. 8. As shown in FIG. 8, the terminal device 800 includes a processor 801, a camera 802, and a display 803.

The picture on the left in FIG. 8 is a front view of the terminal device 800, and the picture on the right in FIG. 8 is a rear view of the terminal device. The processor 801 is disposed in a body of the device. The display 803 may cover all or a part of a front body of the terminal device. The display 803 may be a light emitting diode (LED) screen, or may be a screen of another material. In a possible implementation, the display 803 is provided with a touch-sensitive function to receive a touch operation of a user.

The processor 801 is configured to obtain status information of a terminal device.

The status information may be information directly collected by a sensor of the terminal device, for example, may be information collected by a device, for example, a gravity sensor or a gyroscope, of the terminal device, or may be information obtained after calculation or other processing performed on the foregoing information. The terminal device may be a device such as a smartphone, a tablet computer, or a notebook computer.

In a possible implementation, a value of acceleration due to gravity may be measured using the gravity sensor, and is used as the status information. In another possible implementation, the gyroscope may be used for measurement to determine whether the terminal device is in a stable state, and posture information of the terminal device collected by the gyroscope is used as the status information.

It can be understood that, before the status information of the terminal device is obtained, the terminal device may further obtain trigger information, where the trigger information may enable the terminal device to enter a preview display mode to present, on a display of the terminal device, an image captured by a camera. The trigger information may be information, for example, a shutter button, formed when a user presses a physical key of a mobile terminal, or may be information, for example, activation of a photographing function of a camera by a tap or a swipe, formed after a user performs a corresponding operation on a touchscreen. In a possible implementation, in the preview display mode, the terminal device presents, on the display, an image captured by the camera, to show the user image content that can be captured by the camera currently to facilitate adjustment of a corresponding framing status by the user. However, at this time, a picture has not been taken yet, and a framed image is not stored in a storage medium of the device. In a photographing mode, after the user finishes framing and presses the shutter button, the device obtains an image captured by the camera, and after processing using a corresponding method, a final photo image is stored in the storage medium of the device.

The processor 801 is further configured to obtain photographing scene information of the terminal device 800.

The photographing scene information of the terminal device is mainly used to represent a dynamic range of a photographing scene, usually in a form of a histogram.

Histograms are widely used in image processing, and a brightness histogram is a chart used to present image brightness distribution, and shows image proportions of objects with different brightness in an image. For example, in a histogram of an image, a horizontal axis represents brightness in the image with gradual transition from black to white from left to right, and a vertical axis represents a relative quantity of pixels within a brightness range in the image.

In the field of image photographing processing, a dynamic range is mainly a brightness range of a photographed object, namely, a range that spans from brightness of a darkest spot to brightness of a brightest spot in the photographed object. In a scene with a large dynamic range, there is a relatively large difference between brightness of a brightest part and brightness of a darkest part, and a picture has a high contrast and rich gradients. In a scene with a small dynamic range, most objects have similar brightness, and a picture has a low contrast. The dynamic range may be quantitatively described by a ratio or a difference.

FIGS. 1A, 1B, 1C and 1D shows an example of histograms and dynamic ranges. As shown in FIG. 1A, is a photographed image, and FIG. 1B is a histogram of the image in FIG. 1A. It can be learned from the histogram in FIG. 1B that the image FIG. 1A has a relatively large brightness range and a relatively high dynamic range. FIG. 1D is a histogram of the image in FIG. 1C. It can be learned from the histogram in FIG. 1D that the image in FIG. 1C has a relatively small brightness range and a relatively low dynamic range.

The processor 801 is further configured to determine an image processing mode based on the status information and the photographing scene information. For specific implementations, refer to examples in the foregoing method embodiments and apparatus embodiments, for example, the examples in the embodiment of FIG. 2. Details are not described herein again.

The camera 802 is configured to obtain a current to-be-displayed image based on the determined image processing mode. In a possible implementation, the to-be-displayed image may include a plurality of frames of images taken by the camera after the photographing function is triggered. The to-be-displayed image may be the first frame of image taken by the camera after the photographing function is triggered, or may be the last frame of image taken by the camera in a photographing cycle after the photographing function is triggered, or may be an image taken by the camera at an intermediate moment in a photographing cycle after the photographing function is triggered. The photographing cycle in the example may be a photographing time period for a plurality of frames of images to be taken in an exposure fusion mode. For example, 10 frames of images need to be taken in the first exposure fusion mode, and the current to-be-displayed image may be the first frame of image, the fourth frame of image, or the tenth frame of image. For specific implementations, refer to examples in the foregoing method embodiments and apparatus embodiments, for example, the examples in the embodiment of FIG. 2. Details are not described herein again.

The processor 801 is further configured to process the to-be-displayed image. For specific implementations, refer to examples in the foregoing method embodiments and apparatus embodiments, for example, the examples in the embodiment of FIG. 2. Details are not described herein again.

The display 803 is configured to display a processed image. In a possible implementation, each time the terminal device receives a frame of image, the terminal device merges the frame of image and a processing result of a previous frame of image into an image, and displays a current processing result on the screen for preview until the user ends the processing in advance, but the current image is not stored in the storage medium. Alternatively, after all frames are processed, a final result is stored in the device as a final output for preview by the user. It can be understood that, the terminal device may present the final merged image on the display after the processing is finished. Alternatively, instead of presenting the final merged image immediately, the terminal device may present the final merged image on the display when the user browses images subsequently.

In an example, for first N frames with different exposures, each time a frame is processed, HDR fusion is performed on a current processed frame and a result from a previous frame, and a fusion result is displayed. In addition, a brightness value of the current processed frame is nonlinearly accumulated to an accumulation result from the previous frame, but an obtained accumulation result is neither displayed nor used for fusion.

For M frames with the same exposure, each input frame is first accumulated to a previous accumulation result, the HDR fusion is performed on an obtained accumulation result and an HDR fusion result from a previous frame, and an obtained fusion result is displayed.

In a possible implementation of this embodiment of the present disclosure, when images with the same exposure after the maximum exposure are received, frames of images are nonlinearly accumulated, and an image pyramid is built using accumulation results and is merged with an existing pyramid. Each time a frame of image is received, the built pyramid is rebuilt, and an obtained image is displayed on the screen. The image pyramid is an existing technology used in HDR multi-frame fusion, where images are divided into different image layers based on frequency, weighted summation is performed on image layers corresponding to two images, and results of the layers are superimposed into an image. When the last frame of image is received, or an application is terminated in advance, pyramid rebuilding is performed on the image, to obtain a final output image.

A person of ordinary skill in the art may be aware that, with reference to the examples described in the embodiments disclosed in this specification, modules, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for convenient and brief description, for a detailed working process of the foregoing devices, apparatuses and units, refer to corresponding processes in the foregoing method embodiments, and details are not described herein again.

In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the apparatuses or units may be implemented in an electronic form, a mechanical form or another form.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the other approaches, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes any medium that can store program code, for example, a universal serial bus (USB) flash drive, a removable hard disk, a ROM, a RAM, a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An image processing apparatus, comprising:
 a memory configured to store instructions; and
 a processor coupled to the memory and configured to execute the instructions to cause the image processing apparatus to:
  obtain status information of a terminal device;
  obtain photographing scene information of the terminal device;
  determine, based on the status information, whether a photographing status of the terminal device is stable;
  determine, based on the photographing scene information, whether a photographing scene of the terminal device is a high dynamic scene;
  determine, when the photographing status is unstable and the photographing scene is the high dynamic scene, an image processing mode as an exposure fusion mode in which exposure values of two adjacent frames of a plurality of frames of a plurality of images are different;

calculate, according to the image processing mode, a quantity of frames of images;
obtain a to-be-displayed image based on the quantity of frames of images and the image processing mode; and
display the to-be-displayed image.

2. The image processing apparatus of claim 1, wherein the processor is further configured to execute the instructions to cause the image processing apparatus to determine, when the photographing status is stable and the photographing scene is the high dynamic scene, the image processing mode as an exposure fusion mode in which exposure values of two adjacent frames of the frames of the images are different.

3. The image processing apparatus of claim 1, wherein the processor is further configured to execute the instructions to cause the image processing apparatus to determine, when the photographing status is stable and the photographing scene is not the high dynamic scene, the image processing mode as an exposure fusion mode in which exposure values of the frames of the images are the same.

4. The image processing apparatus of claim 1, wherein the processor is further configured to execute the instructions to cause the image processing apparatus to determine, when the photographing status is unstable and the photographing scene is not the high dynamic scene, the image processing mode as an exposure fusion mode in which exposure values of the frames of the images are the same.

5. The image processing apparatus of claim 1, wherein the status information comprises a value from a gyroscope of the terminal device, and wherein the processor is further configured to execute the instructions to cause the image processing apparatus to:
determine that the value is less than or equal to a first preset threshold that is greater than 0.005 and less than 0.015; and
determine, based on the photographing scene information and the value being less than or equal to the first preset threshold, that the image processing mode is either a first exposure fusion mode or a second exposure fusion mode, wherein exposure values of two adjacent frames of the frames of the images are different in the first exposure fusion mode, and wherein exposure values of the frames of the images are the same in the second exposure fusion mode.

6. The image processing apparatus of claim 1, wherein the status information comprises a value from a gyroscope of the terminal device, and wherein the processor is further configured to execute the instructions to cause the image processing apparatus to:
determine that the value is greater than a first preset threshold that is greater than 0.005 and less than 0.015; and
determine, based on the photographing scene information and the value being greater than the first preset threshold, that the image processing mode is either a first exposure fusion mode or a second exposure fusion mode, wherein exposure values of two adjacent frames of the frames of the images are different in the first exposure fusion mode, and wherein exposure values of the frames of the images are the same in the second exposure fusion mode.

7. The image processing apparatus of claim 1, wherein the processor is further configured to execute the instructions to cause the image processing apparatus to:
determine, based on the photographing scene information, that the photographing scene of the terminal device is the high dynamic scene;
determine the image processing mode as a first exposure fusion mode when the photographing status is stable, wherein exposure values of two adjacent frames of the frames of the images are different in the first exposure fusion mode; and
determine the image processing mode as a second exposure fusion mode when the photographing status is unstable, wherein the exposure values of the two adjacent frames of the frames of the images are different in the second exposure fusion mode, and
wherein an exposure time of the first exposure fusion mode is greater than an exposure time of the second exposure fusion mode.

8. The image processing apparatus of claim 1, wherein the processor is further configured to execute the instructions to cause the image processing apparatus to:
determine, based on the photographing scene information, that the photographing scene of the terminal device is a non-high dynamic scene;
determine the image processing mode as a first exposure fusion mode when the photographing status is stable, wherein exposure values of the frames of the images are the same in the first exposure fusion mode; and
determine the image processing mode as a second exposure fusion mode when the photographing status is unstable, wherein the exposure values of the frames of the images are the same in the second exposure fusion mode, and
wherein an exposure time of the first exposure fusion mode is greater than an exposure time of the second exposure fusion mode.

9. The image processing apparatus of claim 1, wherein the processor is further configured to execute the instructions to cause the image processing apparatus to:
determine, based on the photographing scene information, that the photographing scene of the terminal device is the high dynamic scene; and
determine the image processing mode as a first exposure fusion mode when the status information is less than or equal to a first preset threshold that is greater than 0.005 and less than 0.015, wherein exposure values of two adjacent frames of the frames of the images are different in the first exposure fusion mode; and
determine the image processing mode as a second exposure fusion mode when the status information is greater than the first preset threshold, wherein the exposure values of the two adjacent frames are different in the second exposure fusion mode, and
wherein an exposure time of the first exposure fusion mode is greater than an exposure time of the second exposure fusion mode.

10. The image processing apparatus according to claim 1, wherein the status information comprises a value from a gyroscope of the terminal device, and wherein the processor is further configured to execute the instructions to cause the image processing apparatus to:
determine, based on the photographing scene information, that the photographing scene of the terminal device is a non-high dynamic scene;
determine the image processing mode as a first exposure fusion mode when the value is less than or equal to a first preset threshold that is greater than 0.005 and less than 0.015, wherein exposure values of the frames of the images are the same in the first exposure fusion mode; and
determine the image processing mode as a second exposure fusion mode when the status information is greater than the first preset threshold, wherein the exposure values of the frames of the images are the same in the second exposure fusion mode, and wherein an exposure time of the first exposure fusion mode is greater than an exposure time of the second exposure fusion mode.

11. An image processing method, comprising:
obtaining status information of a terminal device;
obtaining photographing scene information of the terminal device;
determining, based on the status information, whether a photographing status of the terminal device is stable;
determining, based on the photographing scene information, whether a photographing scene of the terminal device is a high dynamic scene;
determining, when the photographing status is unstable and the photographing scene is the high dynamic scene, an image processing mode as an exposure fusion mode in which exposure values of two adjacent frames of a plurality of frames of a plurality of images are different;
calculating, according to the image processing mode, a quantity of frames of images;
obtaining a to-be-displayed image based on the quantity of frames of images and the image processing mode; and
displaying the to-be-displayed image.

12. The image processing method of claim 11, wherein determining the image processing mode comprises determining, when the photographing status is stable and the photographing scene is the high dynamic scene, the image processing mode as an exposure fusion mode in which exposure values of two adjacent frames of the frames of the images are different.

13. The image processing method of claim 11, wherein determining the image processing mode comprises determining, when the photographing status is stable and the photographing scene is not the high dynamic scene, the image processing mode as an exposure fusion mode in which exposure values of the frames of the images are the same.

14. The image processing method of claim 11, wherein determining the image processing mode comprises determining, when the photographing status is unstable and the photographing scene is not the high dynamic scene, the image processing mode as a fourth exposure fusion mode-in which exposure values of the frames of the images are the same.

15. The image processing method of claim 11, wherein the status information comprises a value from a gyroscope of the terminal device, and wherein determining the image processing mode comprises:
determining that the value is less than or equal to a first preset threshold that is greater than 0.005 and less than 0.015; and
determining, based on the photographing scene information, that the image processing mode is either a first exposure fusion mode or a second exposure fusion mode, wherein exposure values of two adjacent frames of the frames of the images are different in the first exposure fusion mode, and wherein exposure values of the frames of the images are the same in the second exposure fusion mode.

16. The image processing method of claim 11, wherein the status information comprises a value from a gyroscope of the terminal device, and wherein determining the image processing mode comprises:
determining that the value is greater than a first preset threshold, wherein the first preset threshold is greater than 0.005 and less than 0.015; and
determining, based on the photographing scene information, that the image processing mode is either a first exposure fusion mode or a second exposure fusion mode, wherein exposure values of two adjacent frames of the frames of the images are different in the first exposure fusion mode, and wherein exposure values of the frames of the images are the same in the second exposure fusion mode.

17. The image processing method of claim 11, wherein determining the image processing mode comprises:
determining, based on the photographing scene information, that the photographing scene of the terminal device is the high dynamic scene;
determining the image processing mode as a first exposure fusion mode when the photographing status is stable, wherein exposure values of two adjacent frames of the frames of the images are different in the first exposure fusion mode; and
determining the image processing mode as a second exposure fusion mode when the photographing status is unstable, wherein the exposure values of the two adjacent frames are different in the second exposure fusion mode, and
wherein an exposure time of the first exposure fusion mode is greater than an exposure time of the second exposure fusion mode.

18. The image processing method of claim 11, wherein determining the image processing mode comprises:
determining, based on the photographing scene information, that the photographing scene of the terminal device is a non-high dynamic scene;
determining the image processing mode as a first exposure fusion mode when the photographing status is stable, wherein exposure values of the frames of the images are the same in the first exposure fusion mode; and
determining the image processing mode as a second exposure fusion mode when the photographing status is unstable, wherein the exposure values of the frames of the images are the same in the second exposure fusion mode, and
wherein an exposure time of the first exposure fusion mode is greater than an exposure time of the second exposure fusion mode.

19. The image processing apparatus of claim 1, wherein the scene information represents a dynamic range of the photographing scene using a histogram.

20. The image processing method of claim 11, wherein the scene information represents a dynamic range of the photographing scene using a histogram.

* * * * *